United States Patent
Ahlstrom et al.

(10) Patent No.: US 6,594,030 B1
(45) Date of Patent: Jul. 15, 2003

(54) INTELLIGENT AUTOMATIC TRAPPING OF PAGE OBJECTS

(75) Inventors: Bret D. Ahlstrom, Woodinville, WA (US); Paul C. Elliot, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/384,651

(22) Filed: Aug. 27, 1999

(51) Int. Cl.$^7$ ............................................. G06F 15/00
(52) U.S. Cl. ...................... 358/1.15; 358/1.9; 358/1.17
(58) Field of Search ..................... 358/1.1, 1.9, 1.13, 358/1.15, 1.17, 500, 515, 538; 382/162, 167, 180, 217, 266; 345/619, 620, 624, 629, 641, 589; 707/500, 512, 517, 525, 530

(56) References Cited

U.S. PATENT DOCUMENTS

| | | | | |
|---|---|---|---|---|
| 5,542,052 A | * | 7/1996 | Deutsch et al. | 345/589 |
| 5,581,667 A | * | 12/1996 | Bloomberg | 358/1.9 |
| 5,666,543 A | * | 9/1997 | Gartland | 715/526 |
| 5,668,931 A | * | 9/1997 | Dermer | 358/1.4 |
| 5,923,821 A | * | 7/1999 | Birnbaum et al. | 358/1.9 |
| 6,262,747 B1 | * | 7/2001 | Rocheleau et al. | 345/434 |
| 6,345,117 B2 | * | 2/2002 | Klassen | 382/167 |

* cited by examiner

Primary Examiner—Gabriel Garcia
(74) Attorney, Agent, or Firm—King & Spalding, LLP

(57) ABSTRACT

In a desktop publishing application program, functionality is provided for automatic trapping of all page objects in a publication. Each page object is trapped as completely as possible, meaning that each page object is subdivided into atomic geometric or color page object components. Each page object component is trapped against all of the page object components of the same page object. These page object components are then trapped against all objects beneath them on a page in the publication. In some cases, page object components are also trapped against page objects above them on the page. Page objects beneath the page object components are decomposed into page object components as well. Page object components may be trapped according to correct adjacency trapping principles as well as general-purpose trapping principles. Text characters contained within page objects in the publication are trapped as well. When a trap is calculated for a given page object, only the necessary portions of the trap are actually rendered onto color plates. Accordingly, minimal traps may be generated for any supported page object in a native desktop publishing application program prior to converting a publication to a page description language for post processing.

23 Claims, 12 Drawing Sheets

FIG. 1 LEGEND:
∴ = YELLOW   ⋙ = BLUE
|||| = GREEN   ≡ = ORANGE

FIG. 4 LEGEND:
⬚ = RED  ▨ = BLUE

FIG. 5 LEGEND:
⋯ = YELLOW  ▨ = BLUE

INTELLIGENT AUTOMATIC TRAPPING OF PAGE OBJECTS

FIELD OF THE INVENTION

The present invention relates in general to improving the quality of printing press output by hiding unwanted gaps between different colored areas on a printed output page. More particularly, the present invention relates to automatically calculating minimal traps for each page object in a publication in a native desktop publishing application, prior to converting the publication to a page description language.

BACKGROUND OF THE INVENTION

Printing presses are used to generate large volumes of high-quality printed output pages. Most printing presses that generate multiple-color output do so by laying down on a printed output page one color of ink at a time, in a multi-pass process. Two types of color jobs that may be run on such printing presses are: process color printing and spot color printing. Process color printing involves four primary ink colors: cyan, magenta, yellow and black. These four primary ink colors are commonly referred to by their initials CMY and K. Cyan, magenta and yellow are subtractive primary ink colors and may be combined to form most other ink colors. Spot color printing involves application of solid areas of a pre-mixed ink rather than overlapping four inks (CMY and K) to create colors. A spot color ink is a specific color, such as a bright orange or a purple, that is laid down on the printed output page in a single pass. Process color printing and spot color printing may be combined, using CMY and K inks along with one or more spot color inks.

As a printed output page moves through a printing press, different colored inks for the printing job are laid down in successive passes. Each ink color is applied by what is commonly called a color plate. Conceptually, each page object of the publication is printed on the printed output page in a back-to-front order. If a page object contains a percentage greater than zero of the ink color corresponding to the current color plate, that object is rendered in that percentage of color on the printed output page. If a page object contains zero percent of the ink color of the current color plate, a white area in the shape of that page object is generated on the printed output page. Generation of a white area in the shape of a page object is called a "knocking out" a color, or rendering a "knockout" of the page object. As the printed output page moves through the printing press, the succession of rendering and knocking out colors of the page objects of the publication for each ink color produces the final printed output. Those skilled in the art will recognize that the physical printing process is somewhat different from the above conceptual description, but that the net effect is equivalent.

Certain factors may cause defects to appear in the printed output pages generated by a printing press. For example, liquid inks may be absorbed, to some degree, into the printed output page and may cause the paper to stretch and deform slightly. Also, because the printed output page moves through the press at high speeds, it may bounce when it is stopped to have an ink color pressed onto it. The effect of these and other factors may be slight variances in the alignment of the various ink colors. Such variances are commonly referred to as misregistration errors. Misregistration errors result in gaps between areas of different color, or areas where one process color ink appears to be out of alignment with others process color inks. One solution to the problem of misregistration errors is known as "trapping."

Trapping does not prevent misregistration errors. Instead, trapping is a procedure that aims to reduce the visibility of misregistration errors. Assuming that limitations of current ink, paper and printing press technologies cannot be removed, trapping provides an effective stopgap solution for hiding misregistration errors on printed output pages. Through analysis of all page objects in a publication, it is possible to determine which ink colors will end up being adjacent to one another on the final printed output pages. Existing trapping heuristics may be used to determine which color combinations, when adjacent to one another, are likely to cause visible misregistration errors.

Trapping is the name given to the process of identifying adjacent color pairs that are likely to cause misregistration errors and hiding the misregistration errors by laying down an extra strip of ink, of a calculated color and width, to cover any gap or misalignment that may occur. Physically, an extra strip of ink only affects the color plate on which it is placed. In other words, an extra strip of ink enlarges the area of color on a particular color plate without causing a knockout of additional white space on other color plates. Accordingly, when the different color plates are composited onto the final printed output page, the extra ink strip covers any gap or misalignment that will occur due to misregistration.

Prior to the invention of the personal computer, trapping was performed manually, by creating hand-doctored images of the printed output pages. The advent of the personal computer and desktop publishing (DTP) software gave rise to the possibility of automatic trapping solutions. Prior art DTP applications typically perform trapping by performing a post-processing step on an output file, such as a PostScript file. Also, prior art DTP applications are not operable to perform trapping with a high level of accuracy.

Certain prior art-high-end trapping applications are capable of trapping with a high level of accuracy, i.e., performing multiple types of trapping along the length of a page object. However, these high-end applications also typically operate on page data in a post-processing manner. That is, high-end trapping applications typically accept as input the page data generated by a DTP application after it has been converted to an intermediate format, such as PostScript or some other proprietary page description language. Post-processing is an expensive and time consuming effort.

Thus, there remains a need for a desktop publishing application that is operable to perform trapping of page objects in the native application, so as to avoid the need for post-processing.

There further remains a need for a desktop publishing application that is operable to perform trapping of page objects in the native application using precise position and color information,

SUMMARY OF THE INVENTION

The present invention meets the above-described needs by providing a desktop publishing (DTP) application program with functionality for automatically generating minimal traps for each page object in the native DTP application program, prior to converting a publication to a page description language. The present invention may leverage and/or build upon the existing functionality of a DTP application program.

In one embodiment, a desktop publishing application program is configured to generate minimal traps for a publication comprising a first page object, a second page object and a third page object. In the exemplary publication, the second page object has a higher Z-order than the first page object and the third page object has a lower Z-order than the first page object. The present invention traps the first page object against the second page object and the third page object by decomposing the first page object into one or more first page object components; self-trapping the first page object components against each other to create one or more trap segments to be added to a trap output list; creating a first trap source list comprising one or more first trap candidate segments from the first page object components, the first trap candidate segments comprising exposed edges of the first page object components that intersect or abut the second page object or the third page object; adjacency trapping the first trap candidate segments against the second page object to remove portions of the first trap candidate segments from the first trap source list; adjacency trapping the first trap candidate segments against the third page object to remove portions of the first trap candidate segments from the first trap source list and to add additional trap segments to the trap output list; general-purpose trapping the first trap candidate segments against the second page object to remove portions of the first trap candidate segments from the first trap source list and to add further trap segments to the trap output list; and rendering the trap segments of the trap output list onto appropriate color plates.

According to one embodiment of the present invention, adjacency trapping a first trap candidate segments against a second page object having a lower Z-order than the first page object involves: detecting whether a potential adjacency trapping situation exists between the first trap candidate segment and the second page object; in response to detecting the potential adjacency trapping situation, performing adjacency trapping between the first trap candidate segment and the second page object to create a trap segment and to remove from the first trap source list any portion of the first trap candidate segment that maps to the trap segment; and performing a color test to determine whether the trap segment is to be added to a trap output list or deleted.

In an exemplary embodiment, detecting a potential adjacency trapping situation involves: determining that the second page object abuts the first page object; decomposing the second page object into second page object components to create a second trap source list comprising second trap candidate segments; comparing the first trap candidate segment to each second trap candidate segment in the second trap source list according to the following steps: (1) comparing the rotation states of the first trap candidate segment and the second trap candidate segment, (2) if the rotation states are equivalent, determining whether the first trap candidate segment and the second trap candidate segment are separated by less than a maximum adjacency trapping distance, (3) if the first trap candidate segment and the second trap candidate segment are separated by less than a maximum adjacency trapping distance, determining whether the first trap candidate segment overlaps the second trap candidate segment in the direction corresponding to the rotation states, (4) if the first trap candidate segment overlaps the second trap candidate segment in the direction corresponding to the rotation states, determining whether the shared extent of the first trap candidate segment and the second trap candidate segment is greater than a predetermined length, and (5) if the shared extent of the first trap candidate segment and the second trap candidate segment is greater than a predetermined length, determining whether respective segment normal vectors for the first trap candidate segment and the second trap candidate segment point in opposite directions, whereby a potential adjacency trapping situation exists if it is determined that the respective segment normal vectors for the first trap candidate segment and the second trap candidate segment point in opposite directions. An exemplary method for adjacency trapping involves: creating a trap segment along the shared extent of the first trap candidate segment and the second trap candidate segment; comparing the trap segment to the first trap candidate segment; and removing from the first trap source list any portion of the first trap candidate segment that maps to the trap segment.

According to an exemplary embodiment of the present invention, general-purpose trapping involves: detecting whether a potential general-purpose trapping situation exists between the first trap candidate segment and the second page object; in response to detecting the potential general-purpose trapping situation, performing general-purpose trapping between is the first trap candidate segment and the second page object to create a next trap segment and to remove from the first trap source list any portion of the first trap candidate segment that overlays the second page object; in response to creating the next trap segment, performing a color test to determine whether the next trap segment is to be added to the trap output list or deleted; and rendering the trap segments from the trap output list onto appropriate color plates to hide misregistration errors between the first page object and the second page object.

An exemplary method for detecting whether a potential general-purpose trapping situation exists involves decomposing the second page object into second page object components to create a second trap source list comprising second trap candidate segments and determining whether the first trap candidate segment intersects any of the second trap candidate segments. An exemplary method for performing general-purpose trapping between the first trap candidate segment and the second page object involves: generating the next trap segment having a length equal to the extent of the intersection between the first trap candidate and the second trap candidate segment; and removing from the first trap source list any portion of the first trap candidate segment overlays the second page object component associated with the second trap candidate segment.

According to another aspect of the present invention, text contained within a text-containing page object is also trapped against other page objects in a publication. If the text-containing page object is opaque, the text therein may be trapped against the background of the text-containing page object. If the text-containing page object is transparent, the text therein may be trapped against page objects beneath the text-containing page object.

In an exemplary embodiment, trapping text contained in an opaque text containing page object against the background of the text containing page object involves: determining the color of the text; determining the background color of the first page object; performing a color calculation on the background color of the first page object and the color of the text to determine that trapping between the text and the first page object is appropriate; using trapping heuristics to calculate a trap width and a trap color; rendering the text on the appropriate color plates as it would appear without trapping; obtaining outline information for each character comprising the text, the outline information defining the outlines of the characters; and rendering the outlines of the characters on appropriate color plates in the trap width and trap color.

In an exemplary embodiment, trapping text contained in a transparent text containing page object against the lower Z-ordered page object involves: determining the color of the text; rendering the text on the appropriate color plates as it would appear without trapping; obtaining outline information for each character comprising the text; converting the outline information into line segments to be stored in a new trap source list; and general-purpose trapping the line segments of the new trap source list against the third page object to create new trap segments to be added to the trap output list.

According to another aspect of the present invention, functionality is provided for performing keepaway trapping on any of trap candidate segments in a trap source list that do not intersect with any other colored page object in the publication. In an exemplary embodiment, keepaway trapping involves: determining if a trap candidate segment is associated with a rich black colored first page object component; and if the trap candidate segment is associated with a rich black colored first page object component, rendering a corresponding thin white segment on all color plates except a black color plate.

BRIEF DESCRIPTION OF THE DRAWINGS

FIG. 5, comprising

FIG. 8, comprising

DETAILED DESCRIPTION

Figure 1A:
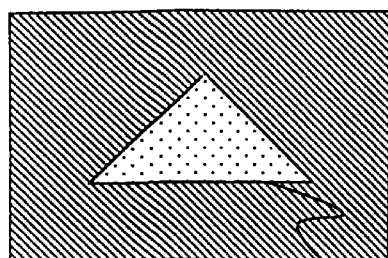
FIG. 1, comprising FIG. 1A, FIG. 1B, FIG. 1C, FIG. 1D and FIG. 1E, provides illustrations of page objects to illustrate some basic trapping examples.

The present invention provides a system and method for automated intelligent trapping of page objects in desktop publishing software. The present invention provides automatic trapping for all page objects in a publication. Each page object is trapped as completely as possible. Complete trapping means that each page object is subdivided into atomic geometric and color components, each of which is then trapped against all of the components from that same page object. The components of a page object may then be trapped against all page objects beneath them on the page and sometimes to page objects above them on the page. The page objects beneath a component of a page object are all decomposed into subparts as well. Page objects that are adjacent to one another are trapped correctly, so as to avoid traps that negatively impact the appearance of the printed output page. Text characters in the publication may be trapped as well. The present invention also allows manual overrides to be set for a page object and its associated components. Manual overrides may be used to handle cases that are not effectively dealt with, in the view of the printing professional, through automatic trapping.

In accordance with the present invention, when a trap is calculated for a given page object, only the necessary portion of the trap is actually drawn. Drawing only the necessary portion of each trap results in a printed output page having highly accurate traps. The high trapping accuracy of the present invention relies on precise size and color information about each page object in a publication, including text characters. Thus, the present invention may be configured to gather data pertaining to each page object and its associated components, including position and size information, rotation angle, and formatting (e.g., color, borders etc.). Using this gathered data, the present invention may calculate precise intersection points for all page object components. Precise intersection points allow the present invention to determine exact locations on the printed output page where trapping will be required to hide misregistration errors.

It should be understood that trapping calculations are based on both geometric and color calculations. Color calculations are used to determine what color ink to lay down in order to hide misregistration errors. Color calculations depend on two things (1) the front-to-back relationship of the page objects (known as the Z-order of the page objects); and (2) the relative luminance of the colors (i.e., the perceived brightness or darkness of the colors). The Z-order, in combination with information about the position of each page object on the page, may be used to determine which ink colors will end up being adjacent to one another on the printed output page.

Over time, heuristics have been developed that use the Z-order and the luminance of two colors to determine the trap color, if any, that should be applied. By convention, there are four main types of traps based on these color heuristics: spread traps, choke traps, centerline traps and keepaway traps. Each of the four main trap types is designed to cover a specific type or range of color combinations and Z-ordering. Also, combinations of these trap types may be applied to any page objects in a publication, including geometric shapes, pictures, gradient and pattern fills and text. The following reference materials, which are herein incorporated by reference, provide more detailed information regarding trapping: (1) "Makeready: A Prepress Resource," by Dan Margulis, MIS:Press, 1996; (2) "The Complete Guide to Trapping (Second Edition)," by Brian P. Lawler, Hayden Books, 1995.

The following description will hereinafter refer to the drawing, in which like numerals indicate like elements throughout the several figures. FIG. 1, which comprises FIG. 1A, FIG. 1B, FIG. 1C, FIG. 1D and FIG. 1E, and the following description are intended to provide some basic trapping definitions and examples.

Spread Traps

A spread trap is a trap created by drawing the foreground color or shape of a page object slightly oversize. Spread trapping is generally employed when the foreground page object is lighter than the background page object, or when the background page object is an indeterminate color (such as a photograph). For example, in FIG. 1A, the yellow triangle page object 102 is positioned on top of a blue rectangle page object 104. In a colorized representation of FIG. 1A, the blue rectangle page object 104 would be visibly darker than the yellow triangle page object 102. Spread trapping would result in the yellow triangle page object 102 being drawn slightly larger than the corresponding knockout generated within the blue rectangle page object 104. In other words, extra yellow ink would be laid down to bridge any misregistration gaps between the yellow triangle page object 102 and the blue rectangle page object 104, thereby improving the quality of the printed output page.

Choke Traps

Figure 1B:
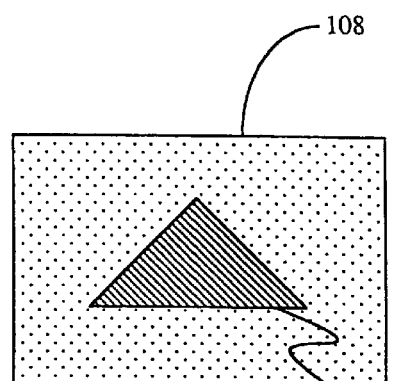
Figure 1C:
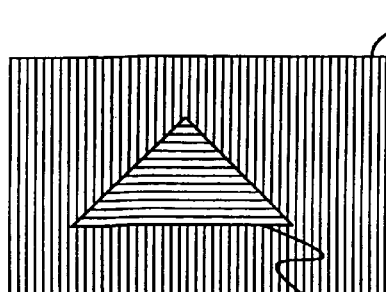

A choke trap is created by drawing a background page object or color slightly oversize. Drawing the background page object slightly oversize effectively reduces the size of the knockout of a higher Z-ordered page object. Choke trapping is typically used when the background page object is lighter in color than the foreground page object, or when the foreground page object is an indeterminate page object such as a photograph. By way of example, FIG. 1B shows a blue triangle page object 106 positioned on top of a yellow rectangle page object 108. Within the yellow rectangle page object 108, application of extra yellow ink along the boundary of the knockout corresponding to the blue triangle page object 106 would create a choke trap.

Centerline Traps

A centerline trap uses colors from both foreground and background page objects to hide misregistration errors. Colors that are close to one another in luminance, but that would still potentially cause misregistration errors are candidates for this centerline trapping. For example, in FIG. 1C, an orange triangle page object 112 is positioned on top of a green rectangle page object 114. If the calculated luminance of the two colors (orange and green) are sufficiently close to each other, a centerline trap is created by slightly enlarging the orange triangle page object 112 and also by slightly shrinking the size of the corresponding knockout within the green rectangle 114. Those skilled in the art will recognize that physical process of centerline trapping is slightly more complicated than the above description, but that the net effect is analogous.

Keepaway Traps

Keepaway traps are used to deal with a special type of black ink, known as rich black ink. Rich black ink is black ink that has had other color components added thereto. Rich black inks are used when large patches of black color are to be printed on the printed output page. Rich black inks are used because they tend to look better than pure black ink.

As an example, rich black ink may be created in a process color print job by adding 20 percent each of cyan, magenta and yellow ink to black ink. Creation of rich black in this manner is accomplished by laying down black, cyan, magenta and yellow inks successively. Accordingly, misregistration errors may occur around the edges of rich black page objects if the cyan, magenta or yellow colors "peek out" from the side of a black page object. A keepaway trap prevents this type of misregistration error from happening by reducing the size of the non-black components of the page object. Reducing the size of the non-black components of the page object allows the bulk of the page object to be seen in the desired rich black color, while preventing misregistration errors from causing unwanted effects at the edges of the page object.

Exemplary Operating Environment

Figure 2:
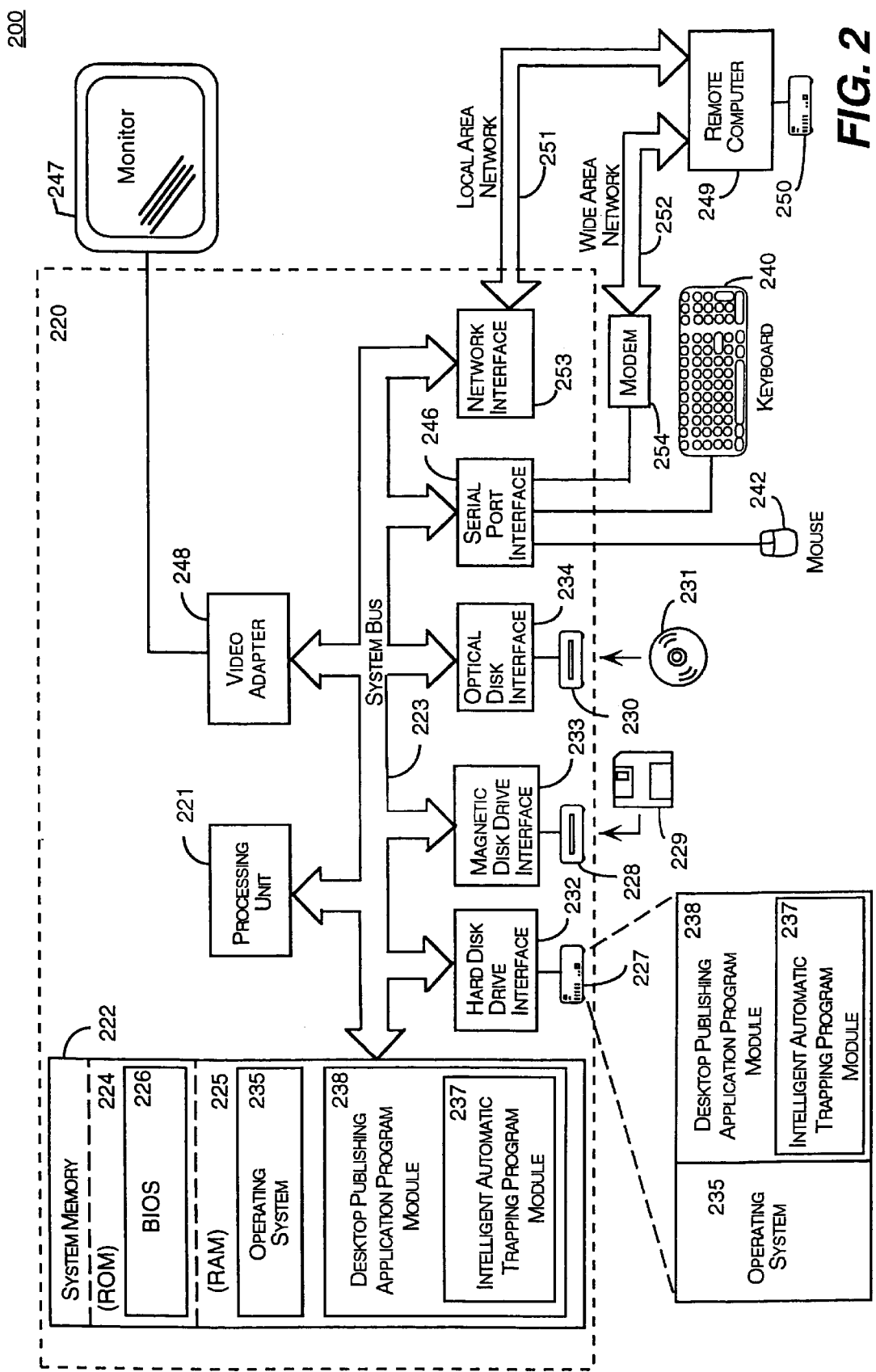
FIG. 2 illustrates an exemplary computing environment for implementation of the exemplary embodiments of the present invention.

FIG. 2 and the following discussion are intended to provide a brief and general description of a suitable computing environment 200 for implementation of the present invention. The exemplary operating environment 200 includes a conventional personal computer system 220, including a processing unit 221, a system memory 222, and a system bus 223 that couples the system memory 222 to the processing unit 221. The system memory 222 includes read only memory (ROM) 224 and random access memory (RAM) 225. A basic input/output system 226 (BIOS), containing the basic routines that help to transfer information between elements within the personal computer system 220, such as during start-up, is stored in ROM 224.

The personal computer system 220 further includes a hard disk drive 227, a magnetic disk drive 228, e.g., to read from or write to a removable magnetic disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage for the personal computer system 220. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

The computer system 220 may include additional input devices (not shown), such as a microphone, joystick, game pad, satellite dish, scanner, or the like. These and other input devices are often connected to the processing unit 221 through a serial port interface 246 that is coupled to the system bus, but may be connected by other interfaces, such as a game port or a universal serial bus (USB). A monitor 247 or other type of display device is also connected to the system bus 223 via an interface, such as a video adapter 248. In addition to the monitor, personal computer systems typically include other peripheral output devices (not shown), such as speakers or printers.

The personal computer system 220 may operate in a networked environment using logical connections to one or more remote computer systems, such as a remote computer system 249. The remote computer system 249 may be a server, a router, a peer device or other common network node, and typically includes many or all of the elements described relative to the personal computer system 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets and the Internet.

When used in a LAN networking environment, the personal computer system 220 is connected to the LAN 251 through a network interface 253. When used in a WAN networking environment, the personal computer system 220 typically includes a modem 254 or other means for establishing communications over a WAN 252, such as the Internet. The modem 254, which may be internal or external, is connected to the system bus 223 via the serial port interface 246. In a networked environment, program modules depicted relative to the personal computer system 220, or portions thereof, may be stored in the remote memory storage device 250. It will be appreciated that the network connections shown are exemplary and other means of establishing a communications link between the computer systems may be used. It will be further appreciated that the invention may equivalently be implemented on host or server computer systems other than personal computer systems, and could equivalently be transmitted to the host computer system by means other than a CD-ROM, for example, by way of the network connection interface 253.

A number of program modules may be stored in the drives and RAM 225 of the computer system 220. Program modules control how the computer system 220 functions and interacts with the user, with I/O devices or with other computers. Program modules include routines, operating systems 235, application programs modules (such as desktop publishing application 238), data structures, and other software or firmware components. In an exemplary embodiment, the present invention may comprise one or more intelligent automatic trapping program modules 237 stored on the drives or RAM 225 of the computer 200. Specifically, intelligent automatic trapping program modules 237 of the present invention may comprise computer implemented instructions for determining intelligent (minimal) traps for page objects within a publication, prior to conversion of the publication to a page description language (e.g., PostScript). As shown, a DTP application program 238 may be modified to include as a component an intelligent automatic trapping program module 237. Alternately, an intelligent automatic trapping program module 237 may be a stand-alone application program that works in conjunction with a DTP application program 238.

Those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

In an exemplary embodiment, the present invention comprises an intelligent automatic trapping program module 237 that may be specially configured as a component of the DTP application program 238 known as Microsoft Publisher, manufactured and produced by Microsoft Corporation, Redmond, Wash. As is known in the art, Microsoft Publisher may be configured to operate in conjunction with Microsoft Windows operating systems 235, such as Windows95, Window98 and Windows NT/Window 2000, also manufactured and produced by Microsoft Corporation, Redmond, Wash. Accordingly, an exemplary embodiment of the present invention may be configured to leverage the resources of Microsoft Publisher and the Windows operating system. In particular, an exemplary embodiment may designed to gather trapping data from two sources. The first source of trapping data is Microsoft Publisher data files that store color and geometric information for all page objects contained within a publication. Such geometric information, including size and positioning information for page objects, exceeds the resolution of all current and foreseeable printing devices. The second source of trapping data is a Graphics Device Interface component of the Microsoft Windows operating systems. This interface, commonly known as GDI, enables Microsoft Publisher to obtain precise position and outline information for text characters in a document. Given these two sources of trapping data, an exemplary embodiment of the present invention may be configured to calculate traps between any page objects in a publication. The traps may be calculated with a high degree of precision, meaning that only an actual intersection between colors receives a trap. Trapping only along the actual intersection of page objects is referred to herein a intelligent trapping.

Those skilled in the art should recognize that the present invention may also be configured as a component of DTP application programs other than Microsoft Publisher and is not limited to a Microsoft Windows operating system environment. The functionality of Microsoft Publisher for interacting with Microsoft Windows GDI for determining and storing geometric information pertaining to page objects may be recreated and incorporated into an exemplary embodiment of the present invention. Likewise, the functionality of Microsoft Windows GDI for obtaining precise position and outline information for text characters page objects may be reproduced and incorporated into an exemplary embodiment of the present invention. Information pertaining to such functionality is generally known within the art and may also be obtained from a number of well-known sources such as: Petzold, Charles, *Programming Windows, The Definitive Guide to the Win32 API*, 5th Ed., Microsoft Press, December 1998, which is herein incorporated by reference.

Figure 1D:
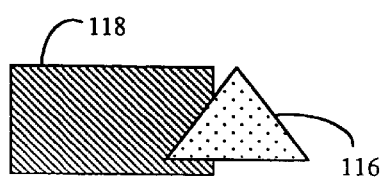
Figure 1E:
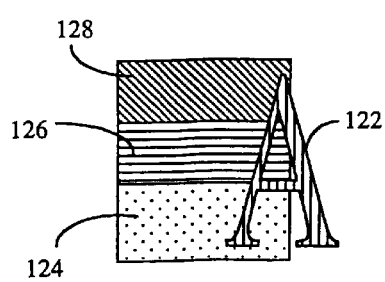

FIGS. 1D and 1E, illustrate situations that call for the highly precise trapping of the present invention. As shown in FIG. 1D, a yellow triangle page object 116 spreads into a lower Z-ordered blue rectangle page object 118. Ideally, a trap should extend only along the intersection between the yellow triangle page object 116 and the blue rectangle page object 118 and not affect the rest of the yellow triangle page object 116. Using the geometric information stored in data files of Microsoft Publisher, an exemplary embodiment of the present invention is capable of calculating the precise intersections between page objects 116 & 118 and generating a trap only where needed.

A more challenging trapping example is shown in FIG. 1E. Potentially, the green 'A' page object 122 may have a choke relationship with the yellow rectangle page object 124, a centerline relationship with the orange rectangle page object 126, and a spread relationship with the blue rectangle page object 128. However, because Microsoft Publisher stores data files containing precise geometric position information for all of the rectangle page objects 124–128 and for the outline of the text page object 122, an exemplary embodiment of the present invention is able to choke the yellow rectangle page object 124 into the 'A' page object 122, centerline trap the 'A' page object 122 to the orange rectangle page object 124, and spread the 'A' page object 122 into the blue rectangle page object 128. Accordingly, even though the 'A' page object 122 represents only a single text character, three different types of trapping may be employed along its length. Also, the portions of the 'A' page object 122 not intersecting any rectangle page object 124–128 are not be trapped at all.

Printing a Multi-Color Print Job

In the world of desktop publishing, printing is the process of rendering a publication to paper. Typically, rendering a publication to paper is accomplished in several steps. First, a DTP application program 238 stores a publication in an internal format for ease of editing. Next, the internal format must be translated into a page description language (such as PostScript) file. Typically, the page description language file is then sent to a machine called a Raster Image Processor (RIP), that converts the page description language file into sheets of film. This film is a transparent media which is used to create the actual metal color plates that are utilized in an offset printing press. Those skilled in the art should also recognize that the above-described printing process may also be performed by way of "computer to plate" (CTP) technology, which enables some computer printers to render a page description language file directly to metal color plates.

As mentioned above, a multi-color print job is created by successively laying down different ink colors to build up the final image on the printed output page. A DTP application program generally creates separate ink color plates through a process known as printing separations. Printing separations involves creating a separate copy of each page in a publication in each ink color. In process color printing mode, there will be cyan, magenta, yellow and black color plates created for each page in the publication. In spot color printing mode, there will typically be a plate for black and then one plate for each spot color in the publication (some spot color print jobs do not have a black plate).

A DTP application program typically does not render color plates in color. Instead, color plates are rendered as grayscale representations of a particular page in a particular color. For example, a 50% cyan page object rendered to the cyan plate would show up as a 50% gray page object. Page objects without any cyan component would result in the generation of a knockout on the cyan plate. Due to this multiple color plate process, a publication with n pages and m ink colors would have (n*m) color plates associated therewith. The general algorithm for creating color plates, referred to herein as a separation-printing loop, is as follows:

For each page in a publication
  For each ink color
    For each page object on the current page, in back-to-front order
    {
    If the page object has a percent of the current color in it
      Render the page object in that percent grayscale
    Else
      Render the page object in white (generating a knockout)
    }

Microsoft Publisher employs this general algorithm to print a color-separated job. It should be noted that these color plates are typically still a step or two away from being used on a commercial press. After each color plate is rendered, the page description language file is generated for those plates. Then, as described above, the page description language file is converted to film that is used to create the metal color plates. Alternatively, the metal plates may be generated directly from the page description language file via CTP technology.

Overview of Trapping Algorithm

An exemplary embodiment of the present invention may be configured to operate within the separation-printing loop described above. As each page object is rendered on each color plate, the intelligent automatic trapping program module 237 is executed to determine if any traps need to be rendered on that plate. As will be apparent to those of ordinary skill in the art, such execution of the intelligent automatic trapping program module 237 means that for each page object, traps are calculated once for each plate. An alternate embodiment may eliminate redundancy by calculating traps only on a first plate and storing the trap data in memory for use with respect to each succeeding plate. Such an alternate embodiment may be computationally less expensive, but may require more memory than the above described embodiment.

Figure 3A:
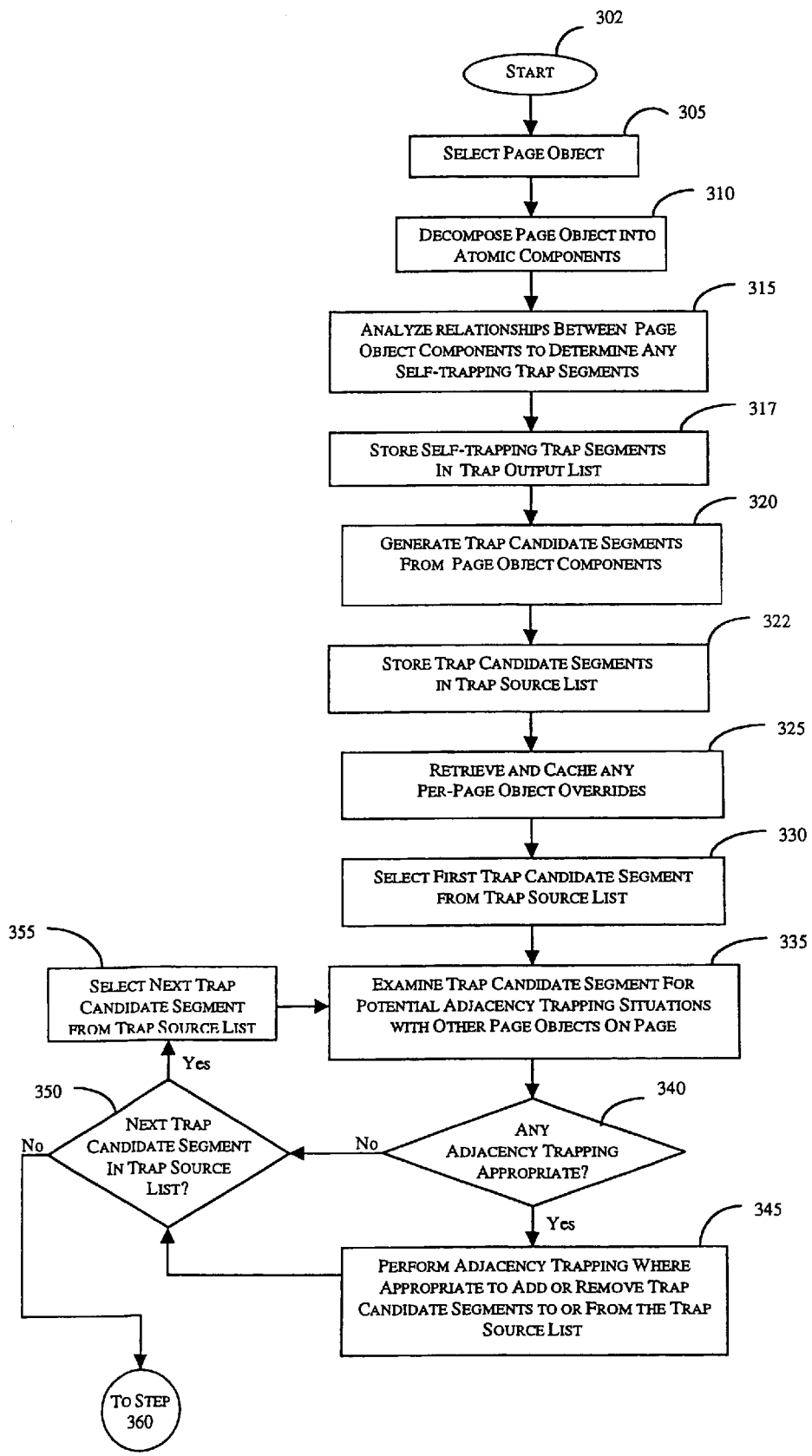
FIG. 3, comprising FIG. 3A and FIG. 3B, provides a flow chart of an exemplary trapping method for an individual page object.
Figure 3B:
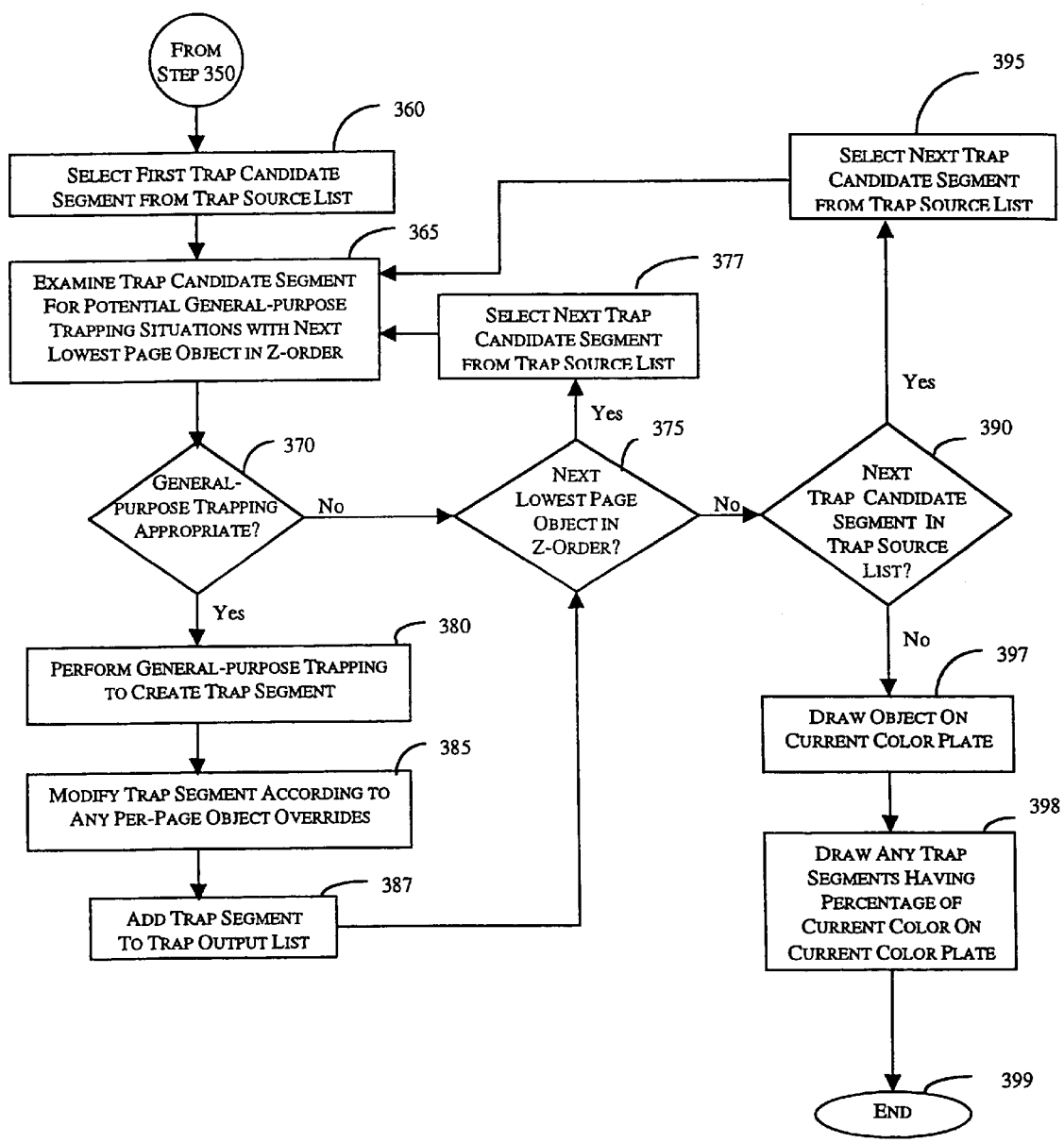

An overview of an exemplary trapping method 300 for an individual page object is illustrated in FIG. 3, which comprises FIG. 3A and FIG. 3B. From starting block 302, the method progresses to step 305 where a page object is selected. At step 310, the selected page object is decomposed into atomic geometric and components. Page object decomposition is essential because automatic intelligent trapping depends on the calculation of precise intersections between areas of different color. Each page object should be decomposed into components of a single color where possible, or of indeterminate color, e.g., a bitmap image of a picture. The precise location, size and orientation of each component also must be determined. As mentioned, geometric, position and size information may be obtained from data files native to Microsoft Publisher.

All page objects in a publication created by Microsoft Publisher have some or all of the following components: fill color, which may be patterned, gradient, transparent and/or solid color; border(s), having a known width and color—zero width meaning no border; graphical contents, e.g., a picture, potentially with transparency; text; and arrowheads or tails. The following types of page objects, with their associated components listed in parenthesis, are supported by Microsoft Publisher: (1) rectangles (fill color, multiple borders); (2) ovals (fill color, single border); (3) polygons (fill color, single border, graphical content); (4) lines (fill color, arrowheads and tails); (5) tables (multiple fill colors, multiple borders, text); (6) text frames (fill color, multiple borders, text); and (7) picture frames (fill color, multiple borders, graphical contents). An exemplary embodiment of the present invention may include a set of computer-implemented instructions for decomposing each supported type of page object into its corresponding components.

Figure 4:
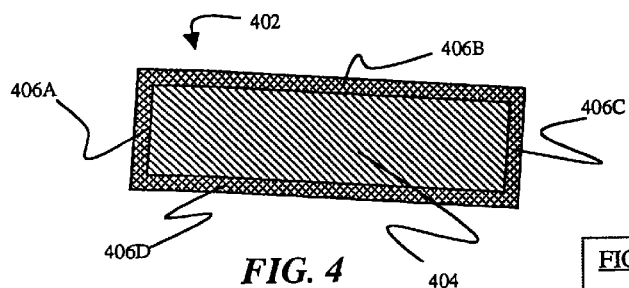
FIG. 4 is an illustration of a rectangle page object to accompany a discussion of page object decomposition.

Page object decomposition may be better understood with reference to the rectangle page object 402 shown in FIG. 4. The rectangle page object 402 is rotated by minus 10 degrees and has a solid blue fill color and four equivalent red borders, each having a width of 4.5 points. In decomposing the rectangle page object 402, a bounding box of the rectangle page object 402 is first determined. A bounding box is a rectangle surrounding the exterior of a page object before any rotation transformation has been applied thereto. Next, appropriate data files stored by Microsoft Publisher are accessed to determine the color, width and position coordinates for the four borders of the rectangle page object 402. As shown in FIG. 4, the top border and the bottom border extend all the way along the rectangle page object 402, while the left border and right border extend only to the top border and the bottom border. The border rectangles 406a–d may then be calculated based on the position coordinates and the known widths of the borders. After the border rectangles 406a–d have been determined, the fill rectangle 404 of the rectangle page object 402 may be derived by subtracting the border rectangles 406a–d from the size of the bounding box. Lastly, the rotation transformation (in this example, −10 degrees) is applied to the vertices of the five stored rectangles (i.e., the four border rectangles 406a–d and the fill rectangle 404), resulting in a determination of the actual display coordinates of the components of the rectangle page object 402. Thus, the rectangle page object 402 may be fully decomposed into atomic elements of known color and precise size and location. Every page object supported by Microsoft Publisher may be similarly decomposed.

Returning to the trapping method 300 of FIG. 3, the relationships between the components of the decomposed page object are next examined at step 315 in order to determine whether any "self-trapping" trap segments should be rendered to hide misregistration errors between the components. Analyzing the relationships between the components of the decomposed page object for potential self-trapping involves determining the intersections between each component and also performing color tests at each intersection to determine whether traps should be applied. If self trapping is determined to be appropriate at step 317, the necessary trap segments are calculated and stored in a trap output list at step 318.

Self-trapping analysis may be further explained with reference to FIG. 4, showing the blue rectangle page object 402 surrounded by four borders. Once decomposed into components, the relationships between the four border rectangles 406a–d may be analyzed. As shown, the left border has intersections with the top and bottom borders equal to the width of the left border. Known color heuristics may be used to determine whether trapping is required at the intersections of the left border and the top and bottom borders. If such trapping is appropriate, the exact intersections between the borders are added to the trap output list. Similar color tests may be performed for every other component-component intersection in the rectangle page object 402. Each other page object type may be analyzed for self-trapping in an equivalent manner.

Returning again to the exemplary method 300 of FIG. 3, after a page object has been decomposed into its component parts and analyzed for self-trapping, the components may be analyzed for trapping against all of the other page objects on the page. First, however, the list of page object components must be broken down into discrete line segments of a known color. Again, an exemplary embodiment of the present invention may include computer-implemented instructions for determining such line segments from a list of page object components for each supported page object type. These line segments are referred to as trap candidate segments and are stored with their respective colors is a trap source list. A trap source list is a list of every edge of the page object that may conceivably intersect with another page object or color on the page. At step 320 the trap candidate segments of the page object components are determined. Then, at step 322, the trap candidate segments are stored in a trap source list. In the case of the blue rectangle page object 402 with the red borders, shown in FIG. 4, trap candidate segments would be generated corresponding to the exterior sides of both left and right borders, as well as for the left and right sides of the top and bottom borders. Also, the top of the top border and the bottom of the bottom border would be added as trap candidate segments to complete the trap source list for this rectangle page object 402. Those skilled in the art should recognize that if the rectangle page object 402 were missing one or more borders, then the fill color would have any of its exposed sides added as trap candidate segments to the trap source list. Also, if the rectangle were transparent, i.e., composed only of borders without a fill color, the interior sides of the borders would be added as trap source candidates to the trap source list, because they may potentially intersect with other page objects.

Those skilled in the art should also recognize that some page object types may have non-linear portions. For example, ovals are by nature curved and some of polygon page object types have curved sections as well. In accordance with an exemplary embodiment of the present invention, such non-linear page objects must be represented as a series of line segments. Fortunately, Microsoft Publisher comprises existing code to approximate a curve as a series of line segments. This existing code may be used to decompose non-linear page objects into atomic components and to derive a list of linear trap candidate segments from the non-linear page objects. The existing code in Microsoft Publisher utilizes a known transformation common in computer graphics rendering. Therefore, the scope of the present invention is not limited to the use of the existing code within Microsoft Publisher. It should also be noted that an exemplary embodiment is configured to operate on linear trap candidate segments due to ease of computation. However, mathematical formulae are known for intersecting various curves and other primitives, which may be effectively incorporated into the present invention at the cost of complicating the computations involved.

Returning once again to FIG. 3., at step 325 any per-page object trapping overrides are retrieved from memory. Per-page object trapping overrides allow a DTP user to manually override the automatic intelligent trapping of the present invention on a per-page object basis. Overrides are useful due to the fact that there may be unforeseeable factors that prevent automatic intelligent trapping from being completely correct. For example, indeterminate page objects, such as gradient fills or pictures, may require a printing professional to fine-tune or change completely the trapping behavior for a page object. By way of illustration, a manual override may designate trapping for a particular page object to always be spread trapping or to always be choke trapping, regardless of the page object's color relationship with other page objects. Manual overrides are cached for later use in calculating actual trap width and color, as will be described below.

After the trap source list is complete, all trap candidate segments in the trap source list are examined for potential adjacency trapping situations in relation to other page objects in the publication. Adjacency trapping is a trapping method that may be applied to page object edges that abut one another without actually overlapping. However, as will be explained below, adjacency trapping may not always be appropriate between abutting page objects. At step 330, the first trap candidate segment of the trap source list is selected for adjacency trapping analysis. At step 335, the first trap candidate segment is compared to other page objects to determine if adjacency trapping is appropriate in potential adjacency trapping situations. If determined to be appropriate at step 340, adjacency trapping is performed at step 345, which causes a trap candidate segment, or portion thereof, to be added to or removed from the trap source list.

At step 350, a determination is made as to whether there are any other trap candidate segments in the trap source list to be examined for potential adjacency trapping. If another trap candidate segment remains, it is selected at step 355 and the method is repeated beginning at step 335. When no other trap candidate segments remain to be analyzed for adjacency trapping, the method advances from step 350 to step 360. Adjacency trapping will be discussed in greater detail with respect to FIGS. 5 and 6.

After any necessary adjacency trapping has been performed to update the trap source list, the remaining trap candidate segments are analyzed for potential general-purpose trapping. General-purpose trapping is a trapping method used in situations where trap candidate segments overlap other components or page objects. In an exemplary embodiment, general-purpose trapping is performed between a trap candidate segment and page objects having a lower Z-order position on the page. At step 360, the first trap candidate in the trap source list is selected for general purpose trapping analysis. At step 365, the first trap candidate segment is compared with the next lowest page object in the Z-order, with respect to the selected page object, to determine if general purpose trapping is appropriate.

If general-purpose trapping is not determined to be appropriate at step 370, a determination is made at step 385 as to whether a next lowest Z-order page object exists. If a next lowest Z-order page object exists, it is selected at step 377 and the method is repeated beginning at step 365. When general-purpose trapping is determined to be appropriate at step 370, the method advances to step 380, where general-purpose trapping is performed to create a trap segment that will hide misregistration errors between the selected page objects. At step 385, the trap segment is modified according to any per-page object manual overrides, if appropriate. Then, at step 387, the trap segment is added to a trap output list. Next, the method returns to step 375 to determine whether there is a next lowest page object in the Z-order.

When no other next lowest Z-order page objects are found at step 375, the method progresses to step 390, where a determination is made as to whether there is another trap candidate segment in the trap source list to be examined for potential general purpose trapping. If a next trap candidate segment is located, it is selected at step 395. Then, the exemplary method is repeated for this next trap candidate segment, beginning at step 377. When no other trap candidate segments are located at step 375, the general purpose trapping analysis is complete. General-purpose trapping will be described in greater detail with respect to FIG. 8. Next, the method advances to step 397, where the selected page object is rendered on the current color plate. Lastly, at step 398, any trap segments in the trap output list having a percentage color of the current color plate are rendered on the current color plate. The exemplary trapping method ends at step 399. The exemplary trapping method may be repeated for each color plate in the printing job.

Adjacency Trapping

The following discussion, with reference to FIGS. 5 and 6, is intended to provide a more detailed explanation of adjacency trapping. Once a page object has had all of its trappable edges added to a trap source list, all trap candidate segments in the trap source list may be trapped against other page objects. In an exemplary embodiment, the first step in trapping trap candidate segments against other page objects is referred to as adjacency trapping. As used herein, the phrase "adjacency trapping" is meant to signify trapping that is applied between page object edges that abut one another without overlapping. As will be explained below, rendering traps for page object edges that abut one another without overlapping may sometimes undesirably reduce the quality of the printed output page. Thus, an exemplary embodiment of the present invention is configured to analyze potential adjacency trapping situations and to render only those traps that will increase the quality of the printed output page.

Figure 5A:
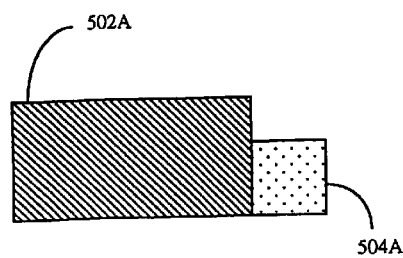
FIG. 5A, FIG. 5B and FIG. 5C, illustrates various rectangle page objects providing examples of three potential adjacency trapping situations.
Figure 5B:
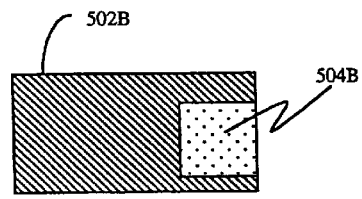
Figure 5C:
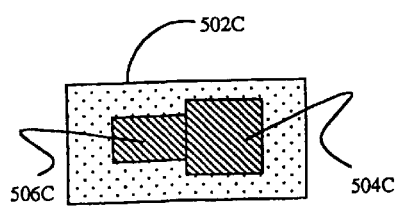

Examples of three potential adjacency trapping situations are shown in FIG. 5, which comprises FIG. 5A, FIG. 5B and FIG. 5C. In the potential adjacency trapping situation of FIG. 5A, a single yellow rectangle page object 504A abuts the blue rectangle page object 502A along one edge that is exterior to both rectangles page objects 502A and 504A. The blue rectangle page object 502A is the hindmost page object (i.e., it has the lowest Z-order). In this potential adjacency trapping situation, a spread trap would be appropriate between the yellow rectangle page object 504A and the blue rectangle page object 502A because the lighter color is on top (i.e., has a higher Z-order). Therefore, adjacency trapping should be applied in the situation shown in FIG. 5A.

In the potential adjacency trapping situation shown in FIG. 5B, the yellow rectangle page object 504B shares an edge with, but is entirely contained within, the blue rectangle page object 502B. Again, a blue rectangle page object 502B is the hindmost page object. Although the colors and Z-orders of the page objects 502B and 504B in FIG. 5B are identical to those of the page objects 502A and 504A in FIG. 5A, a spread trap is not appropriate in the potential adjacency trapping situation of FIG. 5B. A spread trap between the yellow rectangle page object 504B and the blue rectangle page object 502B in FIG. 5B would result in extra yellow ink being drawn outside of both rectangle page objects 502B and 504B along their common edge. Such extra yellow ink would undesirably reduce the quality if the printed output page. Therefore, adjacency trapping should not be applied in the situation shown in FIG. 5B.

In the potential adjacency trapping situation of FIG. 5C, a blue rectangle page object 504C abuts a smaller blue rectangle page object 506C along one edge. The two blue rectangle page objects 504C and 506C are contained entirely within a yellow rectangle page object 502C. In the potential adjacency trapping situation of FIG. 5C, no trap should be rendered between the two blue rectangle page objects 504C and 505C, nor should there be any trapping to the yellow rectangle page object 502C along that shared edge segment. Trapping in this situation would result in visible green lines (or other undesirable visible artifacts) being introduced.

As previously mentioned, a trap source list may store various information, such as geometric and color data, relating to the components of a selected object. Such information may further include a data structure referred to herein as a segment normal vector (SNV). An SNV comprises a vector whose X and Y components are calculated to always point to the interior of the associated page object component. An SNV is defined as being perpendicular to the line segment with which it is associated and is normalized to be a unit vector, i.e., a vector with a length of one. Also stored in the trap source list may be information indicating whether the rotation state of each line segment is vertical, horizontal or rotated to some other angle.

Figure 6A:
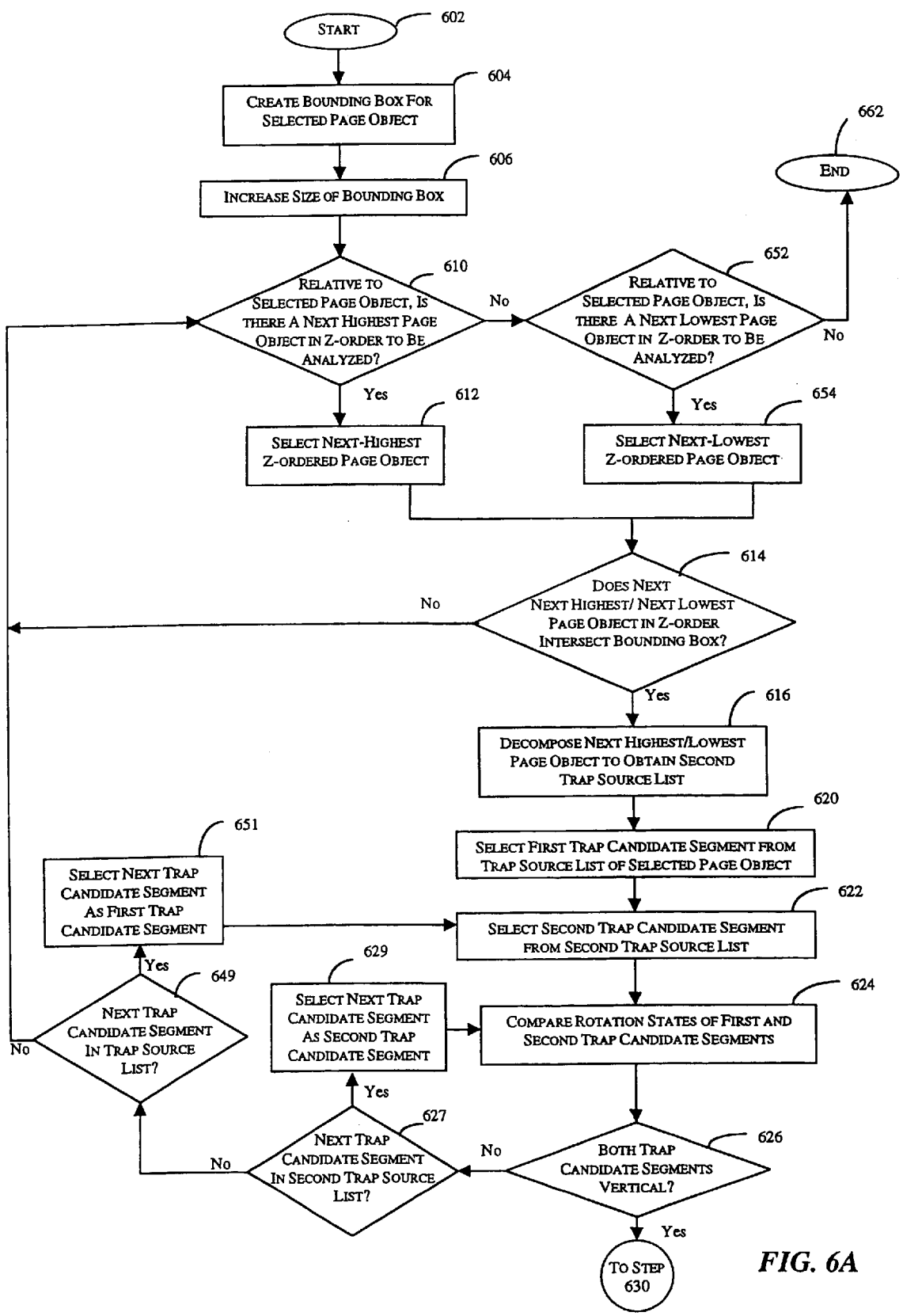
FIG. 6, comprising FIG. 6A, FIG. 6B and FIG. 6C, provides a flow chart illustrating an exemplary method for analyzing a potential adjacency trapping situation.
Figure 6B:
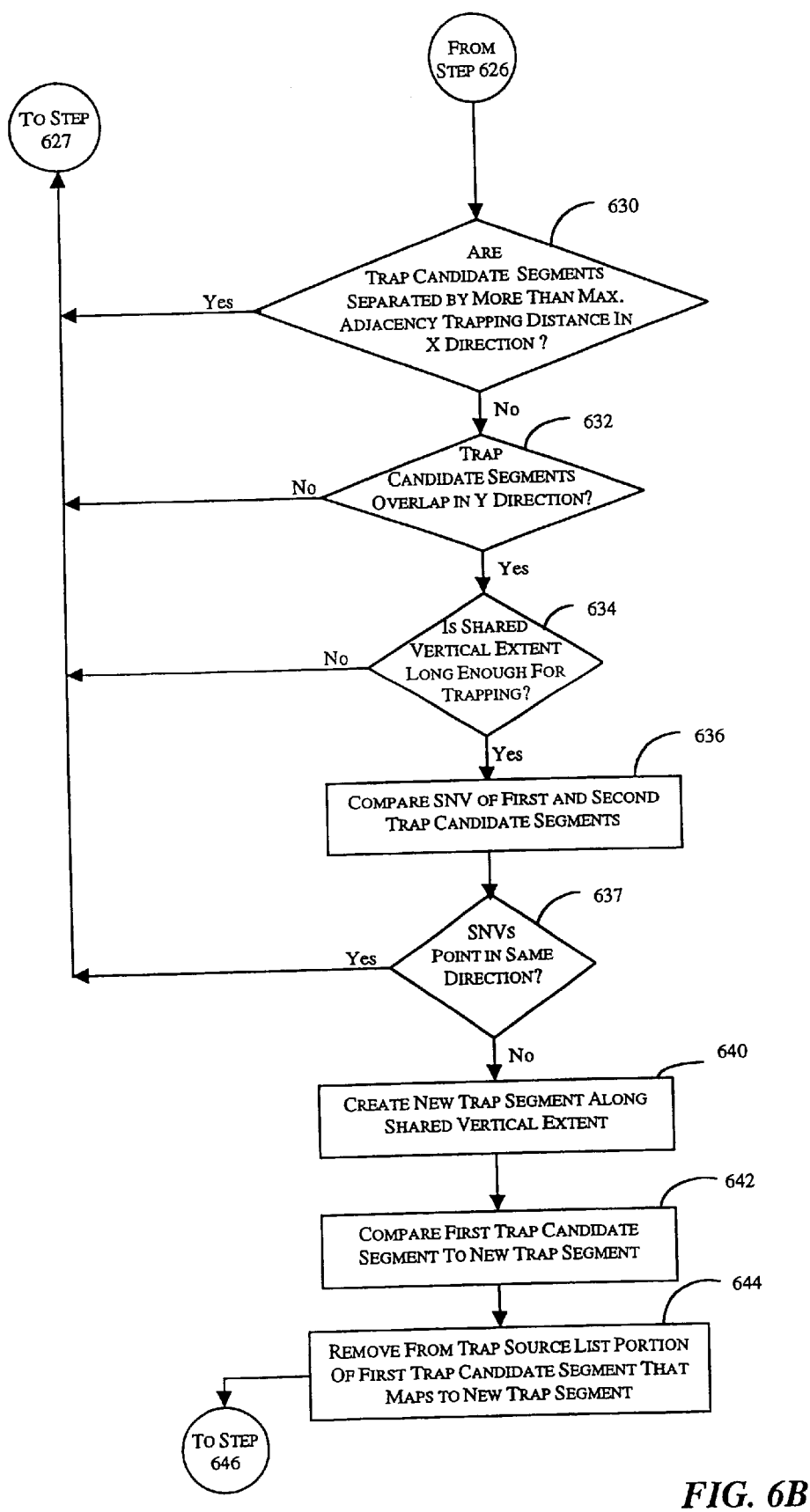
Figure 6C:
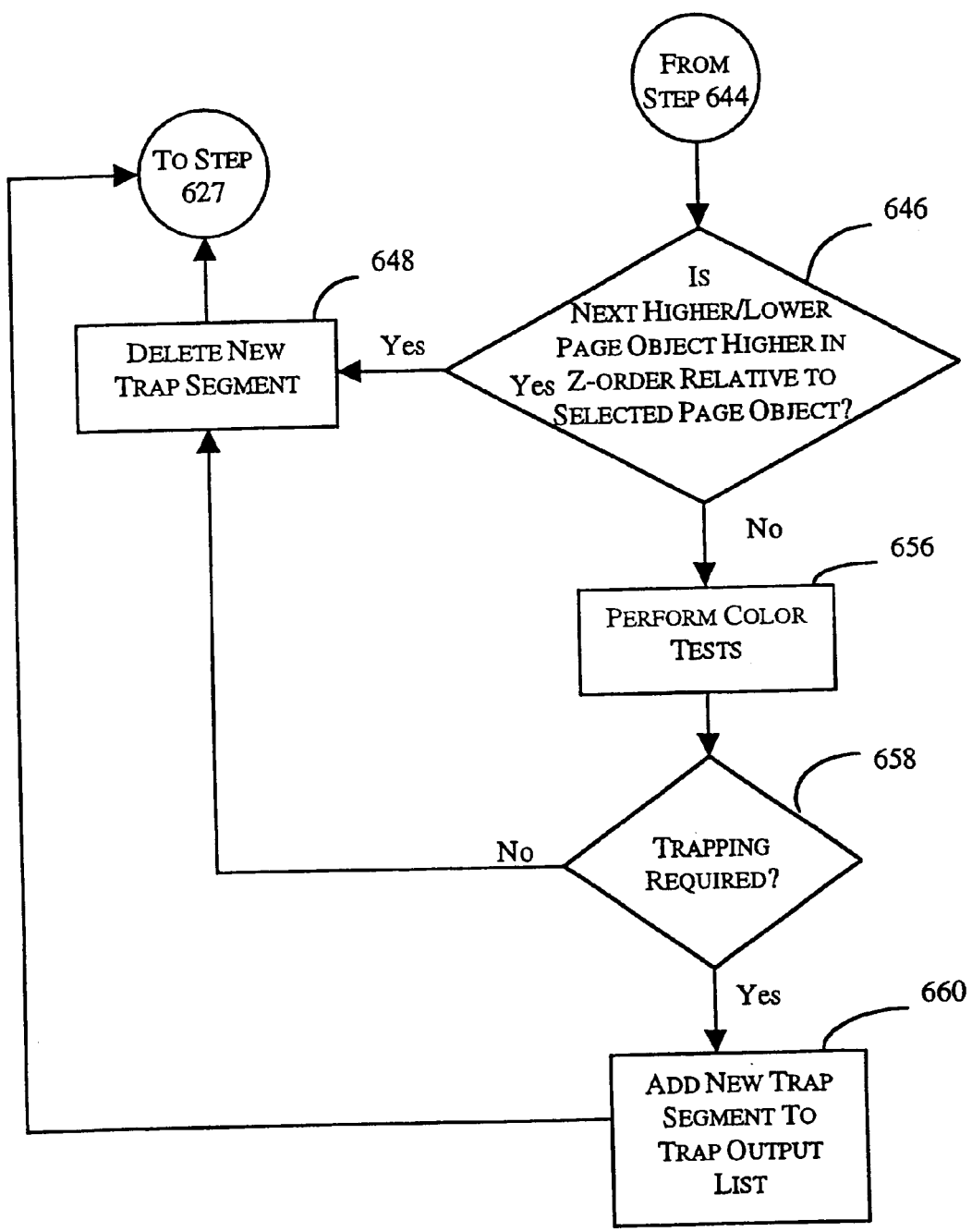

FIG. 6, which comprises FIG. 6A, FIG. 6B and FIG. 6C, and the following description generally describe an exemplary method 600 for analyzing a potential adjacency trapping situation. From starting block 602, the method advances to step 604, where a bounding box is determined for a selected page object. As mentioned, a bounding box comprises a rectangle that determines the vertical and horizontal extents of the page object before any rotation transformations are applied thereto. Next, at step 606, the size of the bounding box for the selected page object is slightly increased. Increasing the bounding box allows an exemplary embodiment to insure that abutting page objects are located when performing bounding box intersection tests. In an exemplary embodiment, bounding a box may be increased by approximately 0.5 point. Still, the percentage increase in bounding box size is an arbitrary number and is not intended to limit the scope of the present invention. The exemplary percentage increase of 0.5 point is based on an estimation of the intentions of the DTP. Specifically, if page objects are closer than a 0.5 point, the exemplary embodiment assumes that the user was trying to create abutting page objects.

The relationships between the selected page object and page objects having a higher Z-order are analyzed first for potential adjacency trapping situations. Adjacency trapping between the selected object and higher Z-ordered page objects generates no actual trap segments, but instead removes from the trap source list all or parts of trap candidate segments where no trapping should occur. At step 610, a determination is made as to whether there is a next higher Z-order page object, relative to the selected page object, to be analyzed for potential adjacency trapping. If a next higher Z-order page object exists, it is selected at step 612. The next higher Z-order page object is then examined at step 614 to determine if it intersects the expanded bounding box of the selected page object. If the next higher Z-order page object intersects the expanded bounding box of the selected page object, the intersecting page object is completely decomposed at step 616 to form a second trap source list. Formation of the second trap source list may be accomplished by the same method as was described above with respect to FIGS. 3 and 4. The second trap source list also contains trap candidate segment and color information, as well as SNV information.

The first and second trap source lists are scanned to detect abutting trap candidate segments. In an exemplary embodiment, scanning the first and second trap source lists involves exhaustively comparing each segment in the first trap source list against each segment in the second trap source list. Thus, at step 620, a first trap candidate segment is selected from the trap source list of the selected page object. At step 622, a second trap candidate segment is selected from the second trap source list. At step 624, the first and second trap candidate segments are compared to determine if they have the same rotation state. The exemplary method 600 is involves adjacency trapping analysis with regard to vertical trap candidate segments. As will be explained below, the exemplary method 600 may also be adapted for adjacency trapping analysis of horizontal trap candidate segments or trap candidate segments that share a common rotation angle. However, if at step 626 the rotation states of the first and second trap candidate segments are not the same, i.e., not both vertical, the method progresses to step 627, where it is determined if a next trap candidate exists in the second trap source list. If a next trap candidate exists in the second trap source list, it is selected at step 629 and the method is repeated beginning at step 624.

When a first trap candidate and a second trap candidate are determined at step 626 to each have a vertical rotation state, the method advances to step 630, where it is determined whether the first and second trap candidate segments are further apart than a minimum adjacency trapping distance. In an exemplary embodiment, the minimum adjacency trapping distance has been arbitrarily defined as slightly less than 0.5 point. Again, the selection of the exemplary minimum adjacency trapping distance is based on an estimation of the intentions of the DTP user. If the segments are further apart than the maximum adjacency trapping distance, no trapping is required and the method proceeds to step 627 to search for a next trap candidate segment in the second source list. However, if the first and second trap candidate segments are not further apart than the maximum adjacency trapping distance, the method continues to step 632, where it is determined if the first and second trap candidate segments overlap in the Y direction.

If the first and second trap candidate segments have no overlap in the Y direction, no trapping is required and the method proceeds to step 627. By way of example, one trap candidate segment may be defined by the coordinates (50, 50) and (50, 100), and the second trap candidate segment may be defined by the coordinates (100, 100) to (100, 150).

Both trap candidate segments are vertical and are close to each other horizontally. However, trapping would not make sense in this example because the trap candidate segments are separated from each other vertically.

If, however, the first and second trap candidate segments do overlap in the Y direction, the method proceeds to step 634, where it is determined whether the length of the shared vertical extent between the two segments is greater than a predetermined length. For example, a first trap candidate segment with coordinates (0,0) and (0,100) and another trap candidate segment with coordinates (40,60) and (40, 200) share a vertical extent defined by the coordinates (X, 60) and (X, 100). In an exemplary embodiment, the predetermined length is defined as 0.5 point. The exemplary predetermined length of 0.5 point allows trivially small trap output segments to be eliminated. If the length of the shared vertical extent is shorter than the predetermined length, it is considered too short for trapping and the method returns to step 627. Otherwise, the first and second trap candidate segments are long enough to be considered for adjacency trapping and the method advances to step 636. At step 636, the SNV information of the first and second trap candidate segments is compared to determine if the components abut each other externally, as in FIG. 5A, or if one component is contained within the other, as in FIG. 5B. As previously mentioned, an SNV is a unit vector that points perpendicularly from the trap candidate segment towards the interior of the associated component. Hence, in the case of vertical trap candidate segments, an SNV will always have coordinates of (0,0) and (1,0) or (0,0) and (–1, 0). Therefor, determining if the respective SNVs of the trap candidate segments point in the same direction may be accomplished through addition of the X components of the respective SNV. If the sum of the respective X components is zero, the normal vectors are opposed.

Thus, if the respective SNVs of the first and second trap candidate segments are determined at step 637 to point in the same direction, one of the components is contained within the other. In that case, no adjacency trapping is performed and the method returns to step 627. However, if the respective SNVs of the first and second trap candidate segments point in opposite directions, the segments abut externally and the method continues to step 640, where a new trap segment is created from the accumulated data. This new trap segment is calculated to be halfway between the first and second trap candidate segments in the X direction, with a vertical extent defined as the common vertical extent of the first and second trap candidate segments. For example, given a pair of trap candidate segments from (0,0) to (0,100) and from (40,60) to (40, 200), a new trap segment would be defined as having coordinates (20,60) and (20, 100). The new trap segment may be added to the trap output list in a later step, if the color calculations so indicate.

Whether or not the new trap segment is eventually added to the trap output list, the portion of the first trap candidate segment should never be trapped against any other page object because of its proximity to the intersecting page object. Otherwise, any traps later created for this new trap segment would almost certainly adversely affect the quality of the printed output page. The trap source list of the selected page object must therefore be modified to reflect the removal of the first trap candidate segment, or a portion thereof. Thus, the first trap candidate segment is compared to the new trap segment at step 642 to determine whether it maps to the entire length of the new trap segment, an end portion of the new trap segment, or a middle portion of the new trap segment. At step 644, the portion of the first trap candidate segment that mapped to the new trap segment is removed from the first trap source list. In particular, if the first trap candidate segment is as long as the new trap segment, the first trap candidate segment is entirely removed from the trap source list. If the first trap candidate segment maps to either end of the new trap segment, one of the first trap candidate segment's endpoints may be updated to effectively shorten the first trap candidate segment. Similarly, if the first trap candidate segment maps to a middle portion of the new trap segment, the first trap candidate may be divided into two shorter trap candidate segments.

As mentioned above with regard to FIG. 5C, a trap segment that is adjacent to a page object with a higher Z-order, should not be trapped to other page objects with lower Z-orders. If color comparisons between the new trap segment and the intersecting page object indicate that a trap should be rendered, that trap will be detected and added when the intersecting (higher Z-ordered) page object is analyzed for potential adjacency trapping. Thus, if at step 646 it is determined that the intersecting page object is of a higher Z-order than the selected page object, the new trap segment is deleted at step 648. After the new trap segment is deleted, the method returns to step 627, where a determination is made as to whether a next trap candidate segment exists in the second trap source list that requires adjacency trapping analysis.

As discussed earlier, each trap candidate segment in the trap source list of the selected page object is compared to each trap candidate segment in the second source list. Thus, when all trap candidate segments from the second trap source list have been compared to the first trap candidate segment, the method progresses to step 649, where it is determined if a next trap candidate segment exists in the trap source list of the selected object. If a next candidate segment exists in the source list that requires adjacency trapping analysis, that next candidate segment is selected as the first trap candidate segment at step 651 and the method return to step 622 for selection of a second trap candidate segment from the second trap source list. When all trap candidate segments in the trap source list of the selected page object have been exhausted, the method proceeds from step 649 to step 610 to search for a next higher Z-ordered page object, relative to the selected page object. The exemplary method 600 continues in this manner until all page objects having a higher Z-order than the selected page object have been analyzed for potential adjacency trapping.

When at step 610, it is determined that no higher Z-ordered page objects remain, the method moves to step 652, where it is determined if a next lower Z-ordered page object exists and requires adjacency trapping. If necessary, the next lower Z-ordered page object is selected at step 654 and the method return to step 614. The method progresses as described above with respect to higher Z-ordered page objects. However, when the method reaches step 646, it will be determined that the intersecting page object has a lower Z-order than the selected page object and the method will advance to step 656.

At step 656, color tests are performed on the new trap segment and the second trap candidate segment. If, at step 658, the color comparisons indicate that misregistration errors will result in a visible gap, the new trap segment is added to the trap output list along with a calculated trap color and width at step 660. However, if the color tests indicate that no trap is necessary, the method returns to step 648, where the new trap segment is deleted. The exemplary method then return to step 627 to continue the potential adjacency trapping analysis of all components of all lower Z-ordered page objects. When all lower Z-ordered page objects have been analyzed for potential adjacency trapping, the method ends at step 662.

As mentioned, the exemplary method 600 may be adapted to deal with trap candidate segment pairs that have horizontal rotation states, or that share a common rotation angle. In particular, if both trap candidate segments are horizontal the exemplary method is identical to the described vertical case, except that all calculations are rotated 90 degrees. For example, the overlap test (step 632), shared extent test (step 634) and segment normal comparison (step 636) are identical to the vertical case except that they deal with differences in the X direction, instead of in the Y direction, or vice versa.

If both trap candidate segments are rotated by the same angle, an exemplary method is identical to the vertical case, except the math is more complicated. In particular, to detect parallelism the slope of the trap candidate segments must be calculated. Also, detection and creation of a new trap segment requires slightly more calculation, as do any distance calculations. Parametric forms of lines may be used to simplify some of these added calculations.

In an exemplary embodiment of the present invention, adjacency trapping analysis is only performed on page objects that are composed mostly of straight lines that are generally grid-aligned, i.e., they are either straight up and down or straight across when the page object is in an unrotated state. The tolerances involved in adjacency trapping are very small. Thus, it has been determined that mostly curved page objects or page objects with non-grid aligned edges will rarely share enough adjacent edges with other page objects to make the computational expense of adjacency trapping analysis worthwhile. Still, the restriction of adjacency trapping analysis to page objects composed of mostly straight, grid-aligned lines is an artificial constraint applied to an exemplary embodiment that may easily be removed in alternate embodiments.

General-purpose Trapping

The adjacency trapping method described above is designed for special situations where page object edges abut without actually overlapping one another. On the other hand, the general-purpose trapping algorithm handles the more common situation in which page objects actually overlap one another, and therefore will be visibly adjacent to each other on the printed sheet. Those skilled in the art should recognize that both adjacency trapping and general-purpose trapping may be applied to a single pair of page objects. An exemplary general purpose trapping method operates on the contents of the trap source list that remain after the adjacency trapping method has potentially removed some segments.

Figure 7:
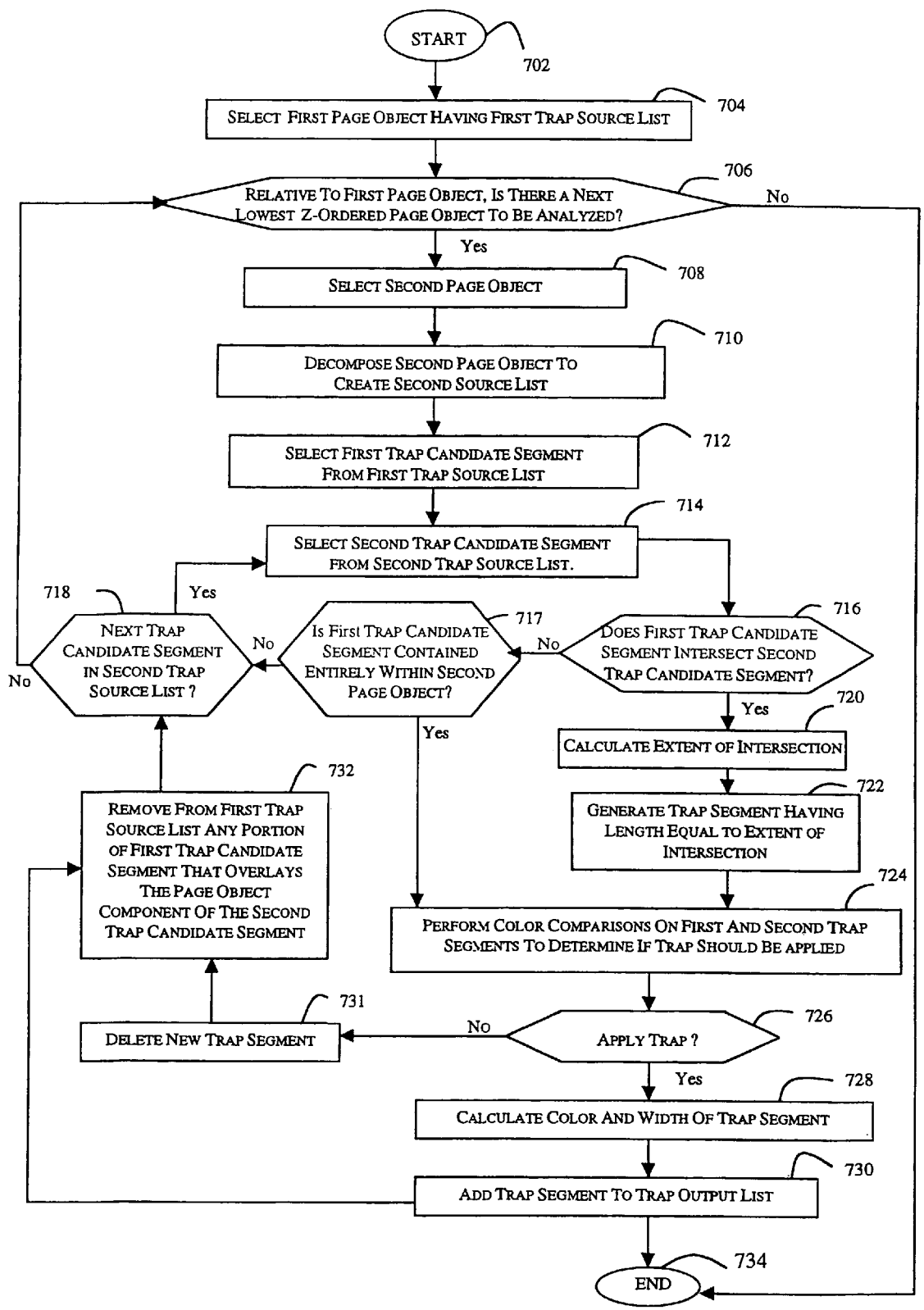
FIG. 7 is a flow chart illustrating an exemplary general-purpose trapping method.

FIG. 7 provides a high-level description of an exemplary general-purpose trapping method. It should be noted that general-purpose trapping is only performed between a selected page object and all page objects beneath the selected page object. Exemplary method 700 begins at starting block 702 and then advances to step 704, where a first page object is selected. It is assumed at this stage that the first page object has an associated first trap source list. Next, at step 706, it is determined whether a next lowest Z-ordered page object exists on the page. If so, the next lowest Z-ordered page object is selected at step 708 as a second page object. Then at step 710, the second page object is decomposed into its atomic components to form a second trap source list.

At step 712, a first trap candidate segment is selected from the first trap source list. At step 714, a second trap candidate segment is selected from the second trap source list. At step 716, a determination is made as to whether the first trap candidate segment intersects the second trap candidate segment. If no intersection is found at step 716, the method progresses to step 717, where it is determined if the first trap candidate segment is contained entirely within the second (lower Z-ordered) page object. If the first trap candidate segment is contained entirely within the second page object, the method advances to step 724, which will be explained below. If the first trap candidate segment is not contained entirely within the second page object, the method advances from step 717 to step 718, where it is determined if another trap candidate segment exists in the second trap source list. If another trap candidate segment exists in the second trap source list, it is selected as the second trap candidate at step 714 and the method continues from that point.

When an intersection is found at step 716, the exact extent of the intersection is determined at step 720 and a new trap segment is generated at step 722. Again, a new trap segment is a line segment that is part of the exact path of intersection between the selected and the intersecting page objects. At step 724, known colors comparisons are performed on the first and second trap candidate segments to determine if a trap ought to be applied. If it is determined at step 726 that no trap ought to be applied, the new trap segment is deleted at step 731. However, if at step 726 it is determined that a trap ought to be applied, the color and width of the trap is calculated at step 728 using accepted heuristics and taking into account any per-page object overrides. At step 730, the trap segment is added to the trap output list, along with its color width.

At step 732, a determination is made as to which portions of the first trap candidate segment overlay the second page object and the trap source list is updated to remove any portions of the first trap candidate segment that overlay the page object component associated with the second trap candidate segment. From step 732, the method returns to step 718 to search for another trap candidate segment in the second trap source list. When no other trap candidate segments are found in the second trap source list, the method moves from step 718 to step 706 to determine whether a next lowest Z-ordered page objects exists on the page. If a next lowest Z-ordered page object exists, the method is repeated for that next lowest Z-ordered page object. When no next lowest Z-ordered page objects exists, the method ends at step 734.

Depending on the shape of the component associated with the second trap candidate segment, determining the portions of the first trap candidate segment that overlay-a second page object (see step 732 of FIG. 7) may require complex calculations. Determining portions of the first trap candidate segment that overlay the second page object involves calculating intersections between the first trap candidate and the component comprising the second page object. Despite the various page object types that may exist on a page, intersections between a line segment and all types of page object components may be distilled to a single general intersection scenario having three subparts.

This general intersection scenario involves the intersection of a line segment with an arbitrary polygon. The three subparts of this general intersection scenario are as follows. (1) The intersection of a line segment with a grid-aligned rectangle. This scenario was chosen as a special case because most pages in a DTP publication contain predominantly grid-aligned rectangular page objects. (2) The intersection of a line segment with an arbitrary n-sided convex polygon. A convex polygon is one in which a line segment drawn from anywhere inside the polygon to anywhere outside the polygon is guaranteed to only cross the polygon boundary in one location. It is computationally quicker to handle intersections with this type of polygon than for any arbitrary polygon. This scenario covers a significant number of page object types, e.g., standard convex polygons, ovals and rotated rectangles. (3) The intersection of a line segment with an arbitrary polygon, which may be either concave or convex. This third case is the most computationally expensive scenario.

An exemplary embodiment of the present invention includes intersection routines, i.e., computer-implemented instructions for calculating intersections between a line segment and a page object component for each subpart of the general intersection scenario. The goal of such intersection routines is to determine the precise portion of a trap candidate segment that lies above a given polygonal component. When such information is known, color tests may be used to calculate a precise minimal trap between that portion of the upper page object and the lower page object. Each of the exemplary intersection routines begin with the same step: determining whether the endpoints of the first trap candidate segment are within the polygon component associated with the second trap candidate segment. Standard point-in-rectangle or point-in-polygon tests may be used for this determination. After determining whether the endpoints of the first trap candidate segment are within the component polygon, execution proceeds along two paths: rectangular page objects and convex polygons are handled in one way, while general polygons are handled separately.

A simple method may be employed to calculate intersections of rectangular page objects and convex polygons. If both endpoints of the first trap candidate segment are within the rectangular or convex polygon component, the entire first trap candidate segment is removed from the first trap source list because, by definition, it is entirely contained within the rectangular or convex polygon component. However, if neither end point of the first trap candidate segment was calculated to be inside the rectangular or convex polygon component, the scenario must be handled as a general polygon (see discussion to follow) because there may be multiple intersection points between the first trap segment and the rectangular or convex polygon component.

If one endpoint of the first trap candidate segment is inside the rectangular or convex polygon component and one endpoint is outside the rectangular or convex polygon component, the point of intersection between the first trap candidate segment and the boundary of the rectangular or convex polygon component is determined through well known mathematical formulas. If an intersection point is found, the portion of the first trap candidate segment that lies inside the rectangular or convex polygon component is removed from the trap source list. If no intersection point is found, one endpoint must lie on an edge of the rectangular or convex polygon component. An endpoint located on an edge of the component polygon is considered to be located both inside and outside the component polygon. In this case, the midpoint of the first trap candidate segment is calculated to determine if the first trap candidate segment is inside the rectangular or convex polygon component. If the midpoint of the first trap candidate is inside the rectangular or convex polygon component, the entire first trap candidate segment is located inside the rectangular or convex polygon component. If the midpoint is outside the rectangular or convex polygon component, the entire first trap candidate segment is located outside the rectangular or convex polygon component.

An exemplary method for calculating intersections of general polygons is considerably more complicated due to the different ways that a line segment may intersect a concave polygon. For example, a single line segment may intersect a concave polygon multiple times, even if both endpoints are inside the shape. Another factor complicating this method is the fact that typical DTP applications store polygons as logical coordinates on a fixed-pitch grid. As such, a single line segment that intersects a polygon at a vertex of two sides may be reported as having two intersection points, when in reality there is only one visible intersection. An additional factor complicating the general polygon intersection calculation is the need to account for floating point round-off errors in mathematical calculations.

As mentioned, page objects may be positioned in terms of a very high-resolution fixed-pitch grid. When segment intersection calculations are performed, floating-point mathematical operations may be employed. Such floating point operations result in a decimal value instead of an integer value. When decimal values are converted back into the integer units required for positioning an intersection on the grid, round-off may be employed. As a single segment is intersected multiple times, round-off error may accumulate and actually shift the integer position of a segment endpoint by one or more units. Although small, round-off errors may be significant enough to render such tests as "point-in-polygon" incorrect.

Figure 8A:
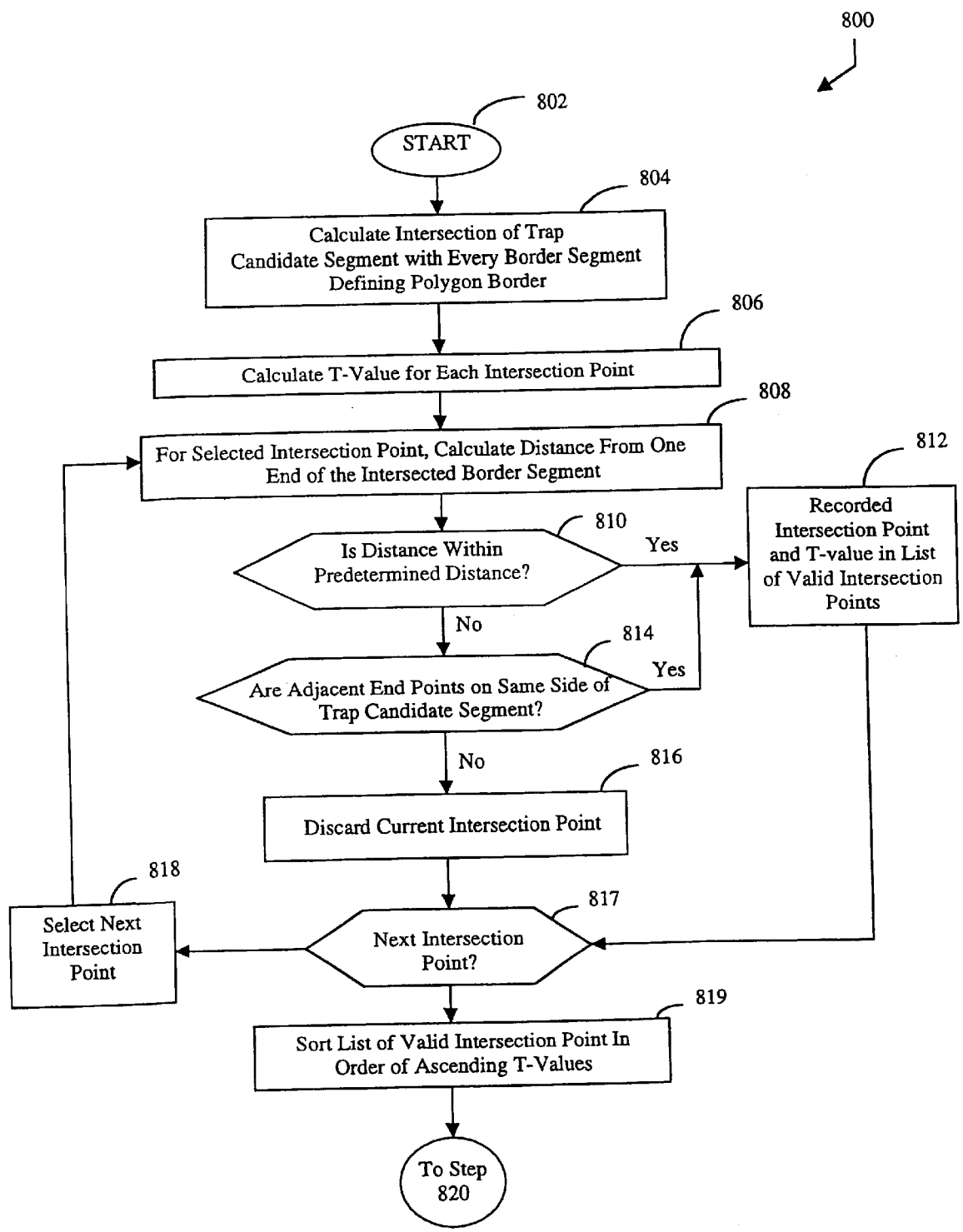
FIG. 8A and FIG. 8B, is a flow chart illustrating an exemplary method for performing a general polygon intersection calculation.
Figure 8B:
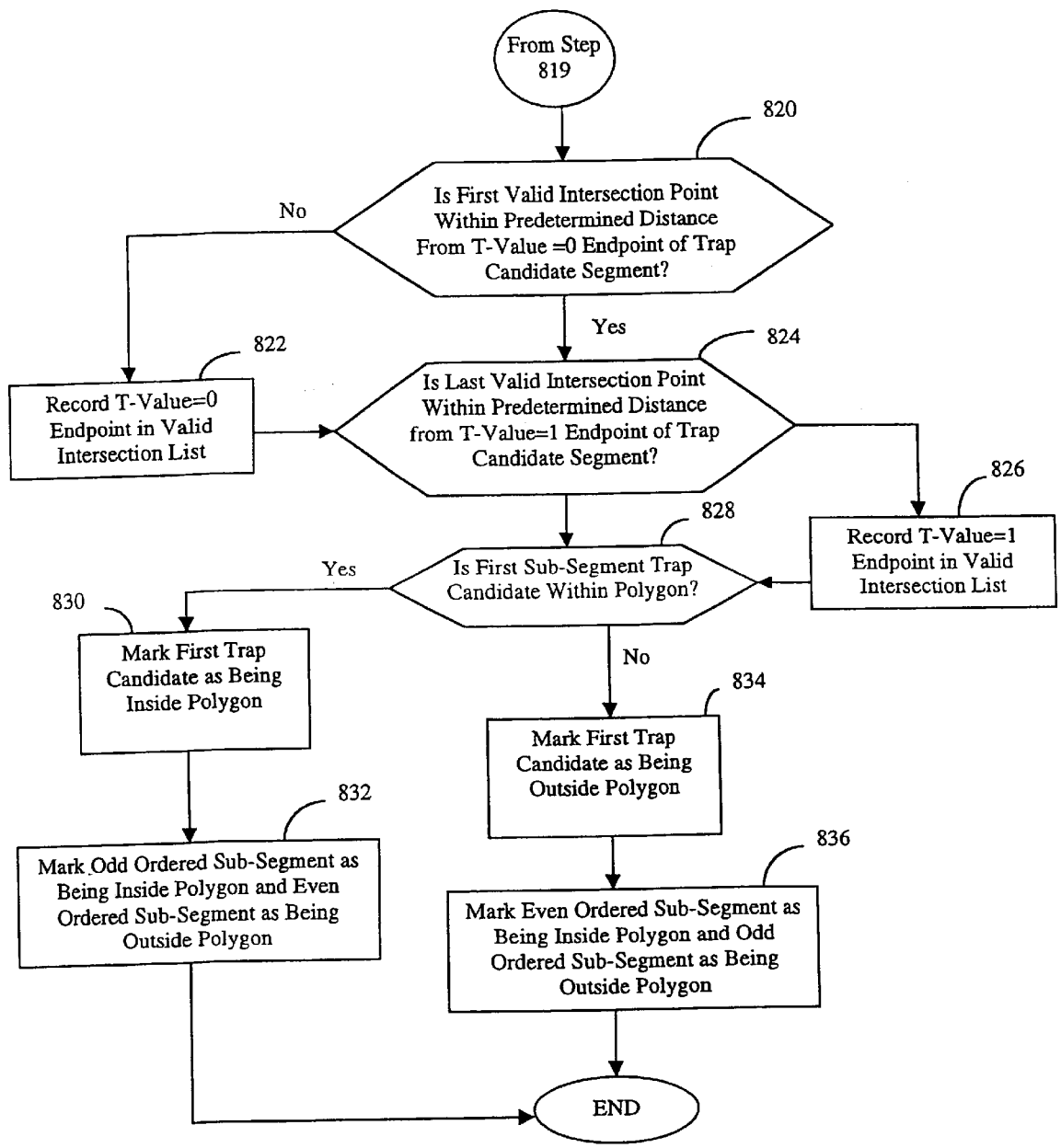

FIG. 8, which comprises FIG. 8A and FIG. 8B, describes the steps involved in an exemplary general polygon intersection calculation. The method 800 begins at starting block 802 and then advances to step 804 where all of the valid intersection points between the first trap candidate segment and every border segment defining the polygon border are calculated. Calculation of intersection points is performed using known mathematical formulas and is optimized for vertical and horizontal line intersections. Calculation of all intersection points is performed to eliminate "false" double intersections where the first trap candidate segment crosses at or very close to a polygon vertex. At step 806, the parametric value for each valid intersection point calculated. As used herein, a parametric value signifies a percentage distance that the intersection point is located from an end point of the trap candidate segment. Parametric values, herein referred to as "T-values," range from 0 to 1. One endpoint of the trap candidate segment is labeled as the T-value=0 end point and the opposite end point is labeled as the T-value=1 end point. Accordingly, an intersection point one fourth of the distance from the T-value=0 endpoint to the T-value=1 endpoint would have a T-value of 0.25. Similarly, an intersection one half of the distance from the T-value=0 end point to the T-value=1 end point would have a T-value of 0.5.

At step 808, an intersection point is selected and the distance from the selected intersection point to one end of the current border segment is calculated. It is only necessary to calculate this distance with respect to one end point because, as the polygon is traversed, each vertex will be visited and this calculation will be performed for each border segment. It has been determined that "false" double intersections are likely to be reported when the distance between an intersection point and a polygon segment end point less than a predetermined distance. In an exemplary embodiment of the present invention, this predetermined distance is defined as five English Metric Units (EMUs), or about $1/180,000$ of an inch. This exemplary predetermined distance is large enough to account for floating point round-off errors in the intersection calculations.

At step 810, if the distance from the intersection point to the border segment end point is greater than the predetermined distance, the intersection point is considered to be valid and the intersection point and its corresponding T-value are recorded at step 812. However, if the distance from the intersection point to the border segment end point is less than or equal to the predetermined distance, the method proceeds to step 814, where further analysis must be performed to determine if the intersection point is a "false" double intersection point.

A polygon may be defined as a closed path of border segments, one of which is currently being analyzed due to its intersection with the trap candidate segment. Thus, the end point of the border segment considered at step 810 is a common end point (i.e., a vertex) for the current border segment and an adjacent border segment. The current border segment and the adjacent border segment each have one other end point, referred to herein as "adjacent endpoints." At step 814, it is determined if these adjacent end points are on the same side of the line defined by the trap candidate segment. Again, known mathematical techniques may be used for this determination. If both of the adjacent end points are on the same side of the trap candidate segment, the intersection point is a considered to be a "false" double point intersection and the calculated intersection point is discarded at step 816. However, if the two adjacent endpoints are determined to be on opposite sides of the trap candidate segment, the intersection point is considered to be valid and its position and T-value are recorded at step 812.

From either step 812 or step 816, the exemplary method 800 proceeds to step 817, where it is determined whether another intersection point remains to be analyzed. If so, the next intersection point is selected at step 818 and the exemplary method is repeated from step 808. When no other intersection point remains to be analyzed, the exemplary method continues to step 819. As a result of analyzing all intersection points, a list of valid intersection points and their corresponding T-values is created. Each of these valid intersection points represents a valid crossing of the polygon by the trap candidate segment. At step 819, the valid intersection list is sorted in order of ascending T-values.

At step 820, it is determined if the first valid intersection point in the sorted valid intersection list is further than a predetermined distance from the T-value=0 endpoint of the trap candidate segment. Again, the predetermined distance in an exemplary embodiment is defined as five EMUs. If the first valid intersection point is further than the predetermined distance from the T-value=0 endpoint, the T-value=0 end point is added to the valid intersection list in sorted order at step 822. Similarly, at step 824, it is determined if the last valid intersection point in the sorted valid intersection list is further than the predetermined distance from the T-value=1 endpoint of the trap candidate segment. If the last valid intersection point is further than the predetermined distance from the T-value=1 endpoint, the T-value=1 end point is added to the valid intersection list in sorted order at step 826. Adding end points of the trap candidate segment to the valid intersection list only if they are further than a predetermined distance from the first and last intersection points prevents tiny trap segments from being generated and handles the case where a trap candidate segment end point is on or very close to the polygon border.

Successive valid intersection points in the valid intersection list define sub-segments of the trap candidate segment. The exemplary method 800 now determines which sub-segments of the trap candidate segment are inside (i.e., overlay) the polygon. Determining which sub-segments are inside the polygon is a simple task once it is determined if the first sub-segment is within the polygon. Successive segments will alternate from inside to outside the polygon, due to the fact that each successive intersection point marks a cross-over point from inside the polygon to outside the polygon, or vice versa.

Therefore, at step 828, the midpoint of the first sub-segment is determined and known mathematical calculations are used to determine if this midpoint lies within the polygon. The midpoint of the first sub-segment is used instead of either end point of the first sub-segment in order to avoid any round-off errors that may occur. If the mid point is determined to be within the polygon, the entire first sub-segment is marked as being inside the polygon at step 830. Then, at step 832, all even ordered sub-segments are marked as being outside the polygon and all odd ordered sub-segments are marked as being inside the polygon. However, if the mid point is determined not to be within the polygon, the entire first sub-segment is marked as being outside the polygon at step 834. Then, at step 836, all even ordered sub-segments are marked as being inside the polygon and all odd ordered sub-segments are marked as being outside the polygon. From either step 832 or step 836, the exemplary method 800 ends at step 838.

As discussed above, with reference to FIG. 7, all sub-segments (portions) of the trap candidate segment determined to be inside the polygon (i.e., overlaying the polygon) are added to the trap output list if the color tests so indicate. All sub-segments found to be outside the polygon are added back to the trap source list, so that they may be analyzed for trapping with reference to page objects further down the in the Z-order.

The output of the exemplary general-purpose trapping method described with reference to FIGS. 7 and 8, is a trap output list that contains trap segments of a specific color and width. Within the general separation printing loop describe above, the entire trap output list is rendered after a current page object is drawn on a current color plate. Rendering a trap segment using the GDI of the Microsoft Windows operating may in some cases produce undesired results. Specifically, when the GDI draws a line segment between two points, rounded ends are placed on the segment. These rounded ends extend past the segment endpoints by approximately one half of the width of the line segment. If a trap segment width is larger than about one fourth of a point, the rounded ends may undesirably become noticeable at page object borders. To combat the problem of rounded ends, a trap segment may be foreshortened by a small amount at both ends before being added to the trap output list. This foreshortening prevents such rounded ends from causing worse visual problems than the trap segments are intended to fix.

However, the process of foreshortening trap segments may have negative consequences of its own, particularly when applied to a rounded shape like an oval. If every segment around the edge of an oval or other rounded page object is foreshortened, gaps begin to form between the trap segments. One possible solution to this problem is to recombine all adjacent trap segments into a "polyline," i.e., a series of connected lines rendered together. A polyline may eliminate the gaps caused by the foreshortening of trap segments and also reduce the size of the PostScript output. Another possible solution is to render trap segments not as line segments but as small rectangles. Precise control may be maintained over the endpoints of rectangles.

Trapping of Text

One possible component of a publication is text. Text characters on a printed page are also susceptible to misregistration errors. Therefore, an exemplary embodiment of the present invention includes functionality for correctly trapping text to the same degree of accuracy as other page objects. As previously mentioned, an exemplary embodiment is configured to operate in conjunction with the Microsoft Publisher DTP. As such, it should be noted that Microsoft Publisher has native support for two page object types capable of containing text: text frames and tables. Text frames are single- or multi-column frames that can have a single background color or pattern. Table frames can have one or more rows and/or columns, dividing the text into individual cells. Each cell has its own text layout and can have its own background and borders. There is no difference between the trapping of text in tables and the trapping of text in text frames. Accordingly, text frames and table cells are referred to herein generically as "text containing" page objects.

Trapping of text is complicated by the fact that text containing page objects may be transparent. When a text containing page object is transparent, the text therein must be trapped to underlying page objects that may be visible through the text containing page object. An exemplary embodiment of the present invention supports highly accurate trapping of text in both transparent and opaque text containing page objects. An exemplary method for trapping text containing page objects is described with reference to FIG. 9.

Figure 9:
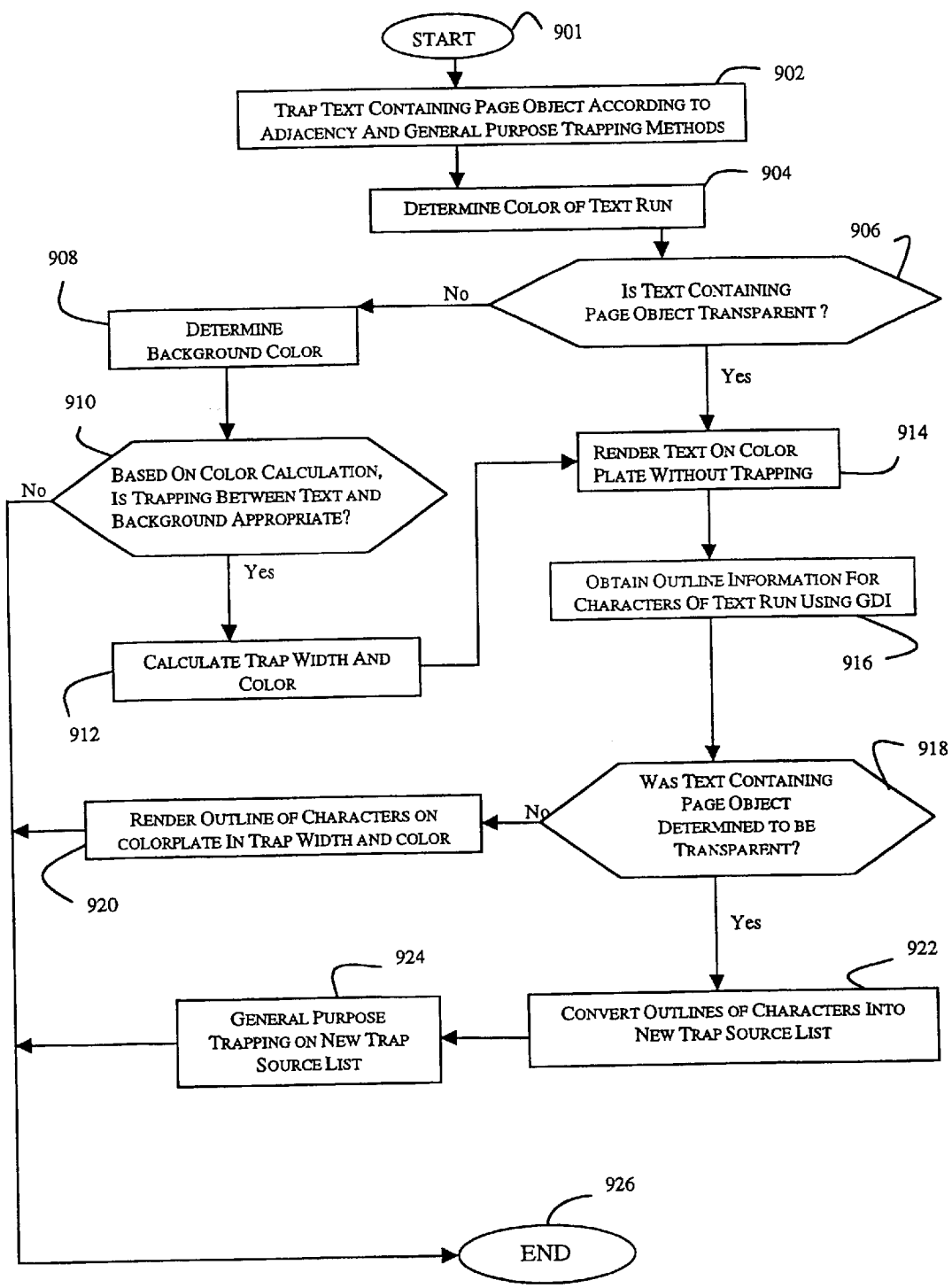
FIG. 9 is a flow chart illustrating an exemplary method for trapping text containing page objects.

In FIG. 9, the exemplary method 900 begins at starting block 901 and proceeds to step 902, where the text containing page object itself is trapped according to the adjacency and general-purpose trapping methods described above with reference to FIGS. 6 and 7. Trapping of the text containing page object itself is performed first because the text is considered to be the topmost (highest Z-ordered) component of a text containing page object. At step 904, the color of a run of text is determined. As used herein, a "run" of text is defined as a contiguous stream of one or more characters that having equivalent formatting, e.g. font, point size, style, color etc. For the sake of simplicity, the following explanation of the exemplary method 900 presupposes a text containing page object containing a single run of text. Those skilled in the art will appreciate that the exemplary method 900 may be repeated for each run of text contained in a multiple text run containing page object.

At step 906, it is determined whether the text containing page object is transparent. If the text containing page object is not transparent, then it must only have one background color. The background color of a non-transparent text containing page object is determined at step 908. From step 908, the method proceeds to step 910, where it is determined, based on color calculations, whether trapping is appropriate between the run of text and the colored background of the text containing page object. If no trapping is appropriate, the method ends at step 926. However, if trapping is appropriate, the trap color and width are calculated at step 912. Calculations of the trap color and width involve not only color heuristics but also take into account the point size of the text according to established printing conventions.

From either step 904 or step 912, the exemplary method 900 advances to step 914, where the run of text is rendered on a color plate within the separation-printing loop just as it would be without trapping. At step 916, the precise positions of the outlines of the characters in the text run are determined using the GDI of the Microsoft Windows operating system. Those skilled in the art will recognize that existing functions may be utilized to interface with the GDI. In particular, the well known GDI function BeginPath may be called to set the GDI into a special "path" mode wherein drawing commands are not rendered to screen. Instead, in the path mode, drawing commands are recorded in path format, i.e., as a series of move, line and curve commands that define the outline of the shapes drawn while GDI is in path mode. While the GDI is in the path mode, normal text drawing code may be executed on the run of text. As a result, the outlines (paths) of the characters in the run of text are recorded as a set of line segments and bezier curves. Next, the well known GDI function EndPath may be called to terminate the path mode. Then, the GDI function GetPath is called to convert the paths of the text characters into an array of drawing commands including the primitives MOVE, LINE and BEZIER that define the exterior of the text characters.

From step 918, if the text containing page object was previously found to be transparent, the method progresses to step 920 where the outlines (obtained from the GDI) of the characters in the run of text are rendered in the trap color and width. If the text containing page object was determined to be transparent, the method advances from step 918 to step 922, where the outlines of the characters in the run of text are converted into a trap source list. Again, known functions for interfacing with the GDI may be employed to convert outlines into a trap source list. In particular, the GDI function FlattenPath may be called to convert all bezier curve segments into a series of straight-line segments. Conversion of bezier curves into straight line segments is required in an exemplary embodiment, which is configured to operate only on straight line segment. However, those skilled in the art will appreciate that an alternate embodiment may be extended to operate on bezier curves. Next, the points that define the straight line segments are converted from GDI coordinates to high-resolution fixed-pitch grid coordinates that are supported by Microsoft Publisher. Each straight line segment is then added to a new trap source list.

At step 924, general-purpose trapping is performed on the new trap source list, as previously described with respect to FIG. 7. As a result of general purpose trapping, each character in the text run may be correctly trapped against page objects underneath the transparent text containing page object. From step 924 or step 920, the exemplary method 900 ends at step 926.

Keepaway Trapping

An additional type of trapping performed by an exemplary embodiment of the present invention is referred to as keepaway trapping. As noted above, keepaway trapping deals with rich black inks. In an exemplary embodiment, keepaway trapping is performed as the final step of trapping because it only operates on trap source segments that do not intersect with any other color. According to an exemplary embodiment, keepaway-trapping involves traversing a trap source list, one trap candidate segment at a time, to determine if any trap candidate segments are associated with a rich black colored page object. If a selected trap candidate segment is associated with a rich black colored page object, that trap candidate segment is added to the trap output list as a keepaway trap segment. A keepaway trap segment is created by a knockout on all color plates except the black color plate. Rendering a keepaway trap effectively shrinks the size of the rich color components, such that they will not protrude from beneath the black color components. In an exemplary embodiment, the above describe keepaway trapping method is performed on all page objects except text. Keepaway traps for rich black text or for white text reversed out of rich black backgrounds are handled during standard color comparison testing.

Alternate Embodiments

In view of the foregoing, it will be appreciated that the present invention provides a method and system for performing automatic intelligent trapping within a desktop publishing application program. Still, it should be understood that the foregoing relates only to the exemplary embodiments of the present invention, and that numerous changes may be made thereto without departing from the spirit and scope of the invention, as defined by the following claims. For example, the following the exemplary embodiments described above may be extended to include trapping of all vector image types. Vector image types are images composed of discrete drawing commands, colors and shapes. Vector image types may be decomposed and trapped in a manner similar to any other page object type. It should be noted that vector image types include many important page object types supported in the Microsoft Windows operating system.

In another alternate embodiment, the present invention may be enhanced to included functionality for trapping text against text. Essentially, the present invention may be configured to perform trapping on any type of page object that may be decomposed into discrete line segments using a DTP application program, such as Microsoft Publisher or the like. These and other alternate embodiments may occur to those of ordinary skill in the art. Accordingly, the scope of the present invention is to be limited not by the disclosed exemplary embodiments, but only by the appended claims.

We claim:

1. In a desktop publishing application program for operating on a publication comprising a first page object and a second page object, the first page object having a higher Z-order than the second page object, a method for trapping the first page object against the second page object comprising the steps of:

decomposing the first page object into one or more first page object components;

creating a first trap source list comprising one or more first trap candidate segments from the first page object components, the trap candidate segments comprising exposed edges of the first page object components that intersect or abut the second page object;

for each of the first trap candidate segments in the first trap source list:

detecting whether a potential adjacency trapping situation exists between the first trap candidate segment and the second page object, in response to detecting the potential adjacency trapping situation, performing adjacency trapping between the first trap candidate segment and the second page object to create a trap segment and to remove from the first trap source list any portion of the first trap candidate segment that maps to the trap segment, and performing a color test to determine whether the trap segment is to be added to a trap output list or deleted;

for each of the first trap candidate segments in the first trap source list:

detecting whether a potential general-purpose trapping situation exists between the first trap candidate segment and the second page object, in response to detecting the potential general-purpose trapping situation, performing general-purpose trapping between the first trap candidate segment and the second page object to create a next trap segment and to remove from the first trap source list any portion of the first trap candidate segment that overlays the second page object, and in response to creating the next trap segment, performing a color test to determine whether the next trap segment is to be added to the trap output list or deleted; and rendering the trap segments from the trap output list onto appropriate color plates to hide misregistration errors between the first page object and the second page object.

2. A computer readable medium having stored thereon computer-executable instruction for performing the method of claim 1.

3. The method of claim 1, wherein detecting whether the potential adjacency trapping situation exists comprises:

determining that the second page object abuts the first page object;

decomposing the second page object into second page object components to create a second trap source list comprising second trap candidate segments;

comparing the first trap candidate segment to each second trap candidate segment in the second trap source list according to the following steps:

comparing the rotation states of the first trap candidate segment and the second trap candidate segment, if the rotation states are equivalent, determining whether the first trap candidate segment and the second trap candidate segment are separated by less than a maximum adjacency trapping distance, if the first trap candidate segment and the second trap candidate segment are separated by less than a maximum adjacency trapping distance, determining whether the first trap candidate segment overlaps the second trap candidate segment in the direction corresponding to the rotation states, if the first trap candidate segment overlaps the second trap candidate segment in the direction corresponding to the rotation states, determining whether the shared extent of the first trap candidate segment and the second trap candidate segment is greater than a predetermined length, and if the shared extent of the first trap candidate segment and the second trap candidate segment is greater than a predetermined length, determining whether respective segment normal vectors for the first trap candidate segment and the second trap candidate segment point in opposite directions, whereby a potential adjacency trapping situation exists if it is determined that the respective segment normal vectors for the first trap candidate segment and the second trap candidate segment point in opposite directions.

4. The method of claim 3, wherein performing adjacency trapping between the first trap candidate segment and the second page object comprises:

creating the trap segment along the shared extent of the first trap candidate segment and the second trap candidate segment;

comparing the trap segment to the first trap candidate segment; and removing from the first trap source list any portion of the first trap candidate segment that maps to the trap segment.

5. A computer readable medium having stored thereon computer-executable instruction for performing the method of claim 4.

6. The method of claim 1, wherein detecting whether the potential general-purpose trapping situation exists comprises:

decomposing the second page object into second page object components to create a second trap source list comprising second trap candidate segments; and determining whether the first trap candidate segment intersects any of the second trap candidate segments.

7. The method of claim 6, wherein performing general-purpose trapping between the first trap candidate segment and the second page object comprises:

generating the next trap segment having a length equal to the extent of the intersection between the first trap candidate and the second trap candidate segment; and removing from the first trap source list any portion of the first trap candidate segment overlays the second page object component associated with the second trap candidate segment.

8. A computer readable medium having stored thereon computer-executable instruction for performing the method of claim 7.

9. The method of claim 1, wherein detecting whether the potential general-purpose trapping situation exists comprises determining whether the first trap candidate segment is contained entirely within the second page object.

10. The method of claim 9, wherein performing general-purpose trapping between the first trap candidate segment and the second page object comprises:

generating the next trap segment having a length equal to the first trap candidate segment; and removing from the first trap source list any portion of the first trap candidate segment overlays the second page object component associated with the second trap candidate segment.

11. A computer readable medium having stored thereon computer-executable instruction for performing the method of claim 10.

12. The method of claim 1, further comprising the step of self-trapping the one or more first page object components against one another to create one or more additional trap segments to be added to the trap output list.

13. A computer readable medium having stored thereon computer-executable instruction for performing the method of claim 12.

14. In a desktop publishing application program for operating on a publication comprising a first page object, a second page object and a third page object, the second page object having a higher Z-order than the first page object and the third page object having a lower Z-order than the first page object, a method for trapping the first page object against the second page object and the third page object comprising the steps of:

decomposing the first page object into one or more first page object components;

self-trapping the one or more first page object components against each other to create one or more trap segments to be added to a trap output list;

creating a first trap source list comprising one or more first trap candidate segments from the one or more first page object components, the one or more first trap candidate segments comprising exposed edges of the one or more first page object components that intersect or abut the second page object or the third page object;

adjacency trapping the one or more first trap candidate segments against the second page object to remove portions of the one or more first trap candidate segments from the first trap source list;

adjacency trapping the one or more first trap candidate segments against the third page object to remove portions of the one or more first trap candidate segments from the first trap source list and to add additional trap segments to the trap output list;

general-purpose trapping the one or more first trap candidate segments against the second page object to remove portions of the one or more first trap candidate segments from the first trap source list and to add further trap segments to the trap output list; and rendering the trap segments of the trap output list onto appropriate color plates.

15. A computer readable medium having stored thereon computer-executable instructions for performing the method of claim 14.

16. The method of claim 14, wherein the first page object is a text containing page object; and wherein the method further comprises trapping the text contained in the first page object against the third page object.

17. The method of claim 16, wherein trapping the text contained in the first page object against the third page object comprises:

determining the color of the text;

determining that the first page object is transparent;

rendering the text on the appropriate color plates as it would appear without trapping;

obtaining outline information for each character comprising the text;

converting the outline information into line segments to be stored in a new trap source list; and general-purpose trapping the line segments of the new trap source list against the third page object to create new trap segments to be added to the trap output list.

18. A computer readable medium having stored thereon computer-executable instructions for performing the method of claim 17.

19. The method of claim 16, wherein trapping the text contained in the first page object against the third page object comprises:

determining the color of the text;

determining that the first page object is opaque;

determining the background color of the first page object;

performing a color calculation on the background color of the first page object and the color of the text to determine that trapping between the text and the first page object is appropriate;

using trapping heuristics to calculate a trap width and a trap color;

rendering the text on the appropriate color plates as it would appear without trapping;

obtaining outline information for each character comprising the text, the outline information defining the outlines of the characters; and rendering the outlines of the characters on appropriate color plates in the trap width and trap color.

20. A computer readable medium having stored thereon computer-executable instructions for performing the method of claim 19.

21. The method of claim 14, further comprising the step of keepaway trapping any of the one or more first trap candidate segments that do not intersect with any other colored page object in the publication.

22. The method of claim 21, wherein keepaway trapping any of the one or more first trap candidate segments that do not intersect with any other colored page object in the publication comprises:

for each of the one or more first trap candidate segments, determining if the first trap candidate segment is associated with a rich black colored first page object component;

for each first trap candidate segment associated with a rich black colored first page object component, rendering a corresponding thin white segment on all color plates except a black color plate.

23. A computer readable medium having stored thereon computer-executable instructions for performing the method of claim 22.

\* \* \* \* \*